(12) United States Patent
Lin

(10) Patent No.: US 10,568,011 B2
(45) Date of Patent: Feb. 18, 2020

(54) METHOD AND APPARATUS FOR SELECTING TARGET NETWORK SIDE DEVICE

(71) Applicant: Huawei Technologies Co., Ltd., Shenzhen, Guangdong (CN)

(72) Inventor: Bo Lin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 588 days.

(21) Appl. No.: 15/160,620

(22) Filed: May 20, 2016

(65) Prior Publication Data
US 2016/0269955 A1 Sep. 15, 2016

Related U.S. Application Data

(63) Continuation of application No. PCT/CN2013/087616, filed on Nov. 21, 2013.

(51) Int. Cl.
*H04W 36/08* (2009.01)
*H04L 12/801* (2013.01)
(Continued)

(52) U.S. Cl.
CPC ............ *H04W 36/08* (2013.01); *H04L 47/34* (2013.01); *H04W 36/18* (2013.01); *H04W 36/24* (2013.01); *H04W 88/16* (2013.01)

(58) Field of Classification Search
CPC ..... H04W 36/08; H04W 36/18; H04W 36/24; H04W 76/022; H04W 76/06; H04L 47/34
See application file for complete search history.

(56) References Cited

U.S. PATENT DOCUMENTS

2009/0086677 A1 4/2009 Ho
2009/0245201 A1* 10/2009 Motegi .................. H04L 49/90
370/331
(Continued)

FOREIGN PATENT DOCUMENTS

CN 101048001 A 10/2007
CN 101207848 A 6/2008
(Continued)

OTHER PUBLICATIONS

"Lossless/Seamless Intra-LTE Handover", NEC, 3GPP TSG RAN2#56, Nov. 6-10, 2006, 6 pages, R2-063138.
(Continued)

*Primary Examiner* — Derrick W Ferris
*Assistant Examiner* — Farhad Ali
(74) *Attorney, Agent, or Firm* — Leydig, Voit & Mayer, Ltd.

(57) ABSTRACT

A method for selecting a target network side device includes: after at least one first network side device completes admission control and receives a data packet for user equipment, selecting, by the user equipment, from the at least one first network side device according to configuration information of the at least one first network side device, a first network side device that meets a first preset condition as a target network side device to communication with the user equipment, where the at least one first network side device is a candidate target network side device that is determined by a second network side device and that is for communication with the user equipment that meets a second preset condition; and sending, by the user equipment to the first network side device, a message instructing the first network side device to provide a service for the user equipment.

19 Claims, 8 Drawing Sheets

(51) Int. Cl.
    *H04W 36/18*      (2009.01)
    *H04W 36/24*      (2009.01)
    *H04W 88/16*      (2009.01)

(56) References Cited

U.S. PATENT DOCUMENTS

2014/0036874 A1*  2/2014  Jeong .................. H04W 48/16
                                                    370/332
2015/0282035 A1* 10/2015  Xia ...................... H04W 36/08
                                                    455/436

FOREIGN PATENT DOCUMENTS

| CN | 101345987 A    | 1/2009  |
|----|----------------|---------|
| CN | 101572922 A    | 11/2009 |
| CN | 102244907 A    | 11/2011 |
| CN | 102487537 A    | 6/2012  |
| CN | 102740386 A    | 10/2012 |
| EP | 1881720 A1     | 1/2008  |
| WO | 2010/121418 A1 | 10/2010 |

OTHER PUBLICATIONS

"PDCP SN continuation for DL Data Forwarding during handover", NTT DoCoMo, Inc., 3GPP TSG-RAN3#57, Aug. 20-24, 2007, 9 pages, R3-071352.

"Mobility performance for small cell deployment scenario 2", Samsung, 3GPP TSG-RAN WG2 Meeting #81bis, Apr. 15-19, 2013, 7 pages, R2-131087.

* cited by examiner

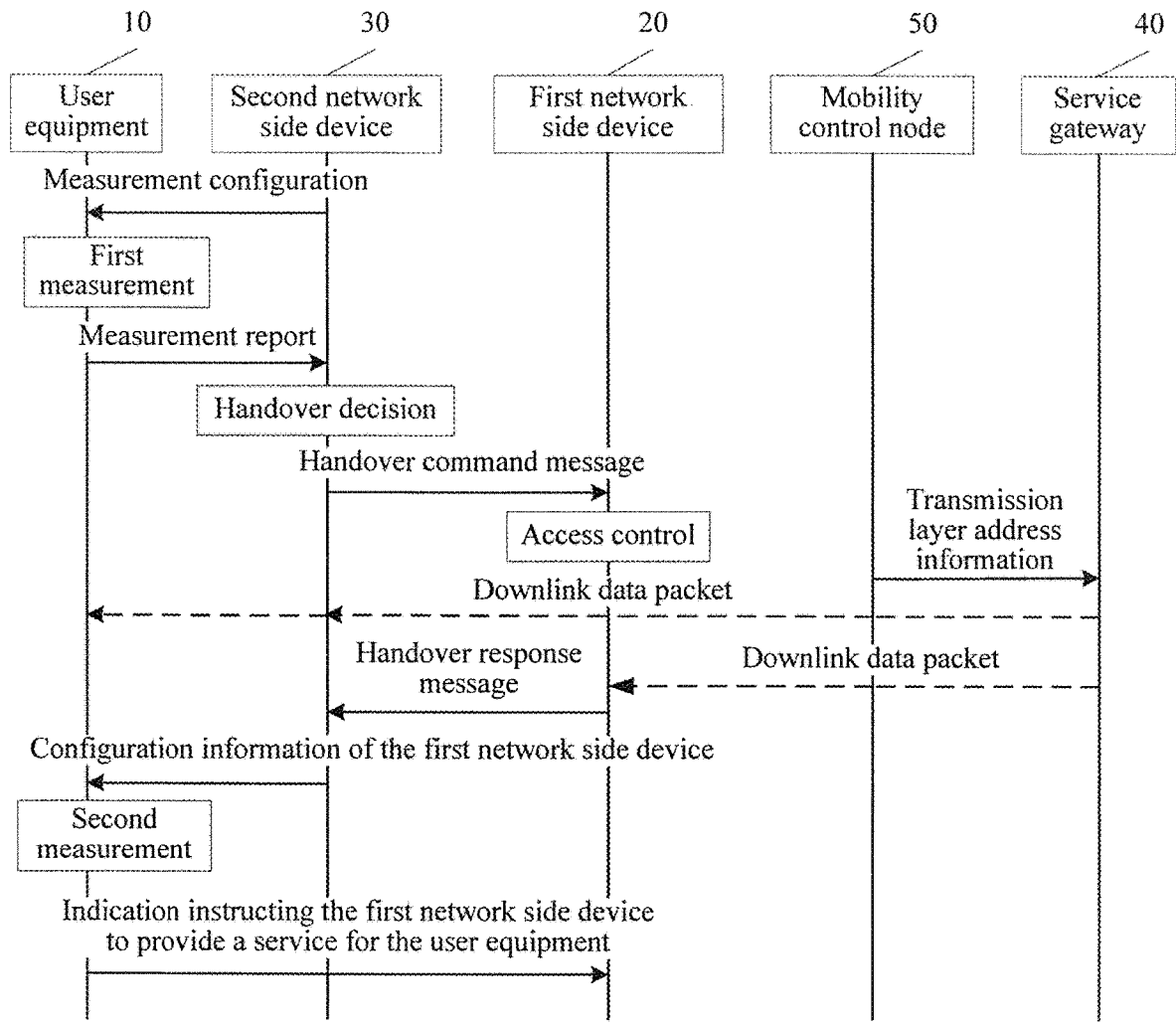

FIG. 2

After at least one first network side device completes admission control and receives a data packet for user equipment, the user equipment selects, from the at least one first network side device according to configuration information of the at least one first network side device, a first network side device that meets a first preset condition as a target network side device for the user equipment to perform communication, where the at least one first network side device is a candidate target network side device that is determined by a second network side device and that is for the user equipment that meets a second preset condition to perform communication  /  301

The user equipment sends, to the first network side device, a message instructing the first network side device to provide a service for the user equipment, so that the first network side device sends the data packet to the user equipment  /  302

FIG. 3

After receiving a handover command message that is of a second network side device and that is for user equipment, a first network side device completes admission control, and receives a data packet for the user equipment, where at least one first network side device is a candidate target network side device that is determined by the second network side device and that is for the user equipment that meets a second preset condition to perform communication, and the data packet for the user equipment is sent by a service gateway to both the first network side device and the second network side device. — 401

The first network side device sends the data packet to the user equipment after receiving, from the user equipment, a message instructing the first network side device to provide a service for the user equipment, where the message instructing the first network side device to provide a service for the user equipment is sent by the user equipment after the user equipment determines that the first network side device meets a first preset condition — 402

FIG. 4

A second network side device receives, from a service gateway, a data packet for user equipment, where the data packet is sent by the service gateway to both the second network side device and at least one first network side device, and the at least one first network side device is a candidate target network side device that is determined by the second network side device and that is for the user equipment that meets a second preset condition to perform communication — 501

The second network side device sends configuration information of the at least one first network side device to the user equipment after receiving, from the service gateway, an indication indicating that the data packet is concurrently sent successfully, so that the user equipment can directly communicate with the first network side device — 502

FIG. 5

METHOD AND APPARATUS FOR SELECTING TARGET NETWORK SIDE DEVICE

CROSS-REFERENCE TO RELATED APPLICATIONS

This application is a continuation of International Application No. PCT/CN2013/087616, filed on Nov. 21, 2013, which is hereby incorporated by reference in its entirety.

TECHNICAL FIELD

The present invention relates to the field of communications technologies, and in particular, to a method and an apparatus for selecting a target network side device.

BACKGROUND

With development of mobile Internet, a terminal user has a higher requirement for a bandwidth. To increase a network throughput, multiple small sites may be introduced to a cell of a macro base station (Macro eNB) to construct small cells (small cells), and the small sites are distributed in service hotspot areas, or coverage hole areas. In this case, when user equipment UE moves to these areas, services of the UE may be handed over to these small cells, to implement service offloading or coverage compensation, thereby achieving an objective of increasing a system capacity, increasing a user throughout, or improving coverage.

The following describes, by using an LTE (long term evolution) network as an example, a process of handing over a downlink service of UE.

A communications system includes: UE, an SeNB (source base station), a TeNB (Target eNB, target base station), and an SGW (service gateway).

The first is a handover preparation process, and perform step 1: The SeNB performs measurement configuration on the UE, where a measurement result of the UE is used to assist the SeNB in making a handover decision.

Step 2: The UE sends a measurement report to the SeNB according to the measurement configuration.

Step 3: After receiving the measurement report, the SeNB makes a handover decision according to the measurement report.

Step 4: The SeNB sends a handover command message to the TeNB, and the TeNB prepares for handover.

Step 5: The TeNB executes admission control according to received QoS (Quality of service) information borne in an EPS (evolved packet system).

If the TeNB includes sufficient resources, the TeNB reserves resources for the UE according to the received QoS information borne by the EPS, generates radio resource configuration information, and reserves one C-RNTI (cell radio network temporary identifier) for the UE, to prepare for the handover After the TeNB completes the preparation, go to step 6: The TeNB sends a handover request acknowledgement message to the SeNB, to notify the SeNB that the handover preparation is completed, where the handover request acknowledgement carries the generated radio resource configuration information and the C-RNTI.

Step 7: Start a handover execution process, and the SeNB sends a handover command message to the UE.

The handover command carries necessary information, such as a new C-RNTI, a security algorithm identifier of the TeNB, a dedicated random access preamble, an end time indication of a dedicated preamble, and a system information block of the TeNB.

Step 8: The SeNB sends an SN (Sequence number, data packet sequence number) status transmission message to the TeNB, to notify the TeNB of a receiving status of a downlink PDCP SN (packet data convergence protocol sequence number) of the UE, so that the TeNB knows a current data transmission status of the UE.

In the following steps 9 to 11, after the handover command is received, the UE executes a process of synchronizing with the target eNB and connects to a target cell.

Step 9: The UE executes a synchronization process, to synchronize with the TeNB, and a network responds to the synchronization.

Step 10: After the UE successfully connects to the TeNB, the UE sends a handover acknowledgement message to the target base station.

Step 11: The TeNB sends a path switch response (Path switch Request response) message to an MME (mobility management entity) of the UE, to notify the MME that a base station that serves the UE changes.

Step 12: After receiving the path switch response, the MME of the UE sends a modify bearer request message to the SGW of the UE, to notify the SGW that a connection of a user plane needs to be switched from the SeNB to the TeNB, that is, a downlink path of the user plane is switched to the TeNB.

Step 13: The SGW returns a modify bearer response message to the MME, to confirm a connection update of the user plane.

Step 14: The MME returns a path switch response acknowledgement character (path switch request ACK) to the TeNB.

Step 15: The TeNB sends a resource information release message of the UE to the SeNB, to notify the SeNB that the handover has been completed, and a resource and information that are related to the UE can be released.

Step 16: The SeNB releases information related to the UE, such as radio and control plane resources.

It can be seen that, a handover preparation process needs to take a long time. When ping-pong handover occurs on a cell edge or the UE rapidly moves between cells, the foregoing handover preparation process needs to be performed each time the UE is handed over, and rapid handover between cells cannot be implemented; therefore, handover efficiency of the UE is reduced, and a case of poor quality of service of a service or even a call drop occurs, which affects user experience for the service.

SUMMARY

The present invention provides a method and an apparatus for selecting a target network side device, to implement rapid handover of user equipment between cells, thereby improving handover efficiency and reducing call drops.

According to a first aspect, a method for selecting a target network side device is provided, including: after at least one first network side device completes admission control and receives a data packet for user equipment, selecting, by the user equipment from the at least one first network side device according to configuration information of the at least one first network side device, a first network side device that meets a first preset condition as a target network side device to communication with the user equipment, where the at least one first network side device is a candidate target network side device that is determined by a second network side device and that is for communication with the user equipment that meets a second preset condition; and sending, by the user equipment to the first network side device, a message instructing the first network side device to provide a service for the user equipment, so that the first network side device sends the data packet to the user equipment.

With reference to the first aspect, in a first possible implementation manner, the data packet for the user equipment is sent by a service gateway to both the at least one first network side device and the second network side device.

With reference to the first aspect or the first possible implementation manner, in a second possible implementation manner, after the selecting, by the user equipment from the at least one first network side device according to configuration information of the at least one first network side device, a first network side device that meets a first preset condition as a target network side device to communication with the user equipment, the method further includes: sending, by the user equipment to the first network side device, a user side protocol sequence number of the last data packet that is received by the user equipment before the user equipment communicates with the first network side device or a user side protocol sequence number of a data packet that the user equipment expects to receive next time, so that the first network side device can determine, according to the user side protocol sequence number, protocol sequence number mapping information of the data packet that is from the second network side device and that is for the user equipment, and a network side protocol sequence number of the data packet received by the first network side device, a user side protocol sequence number of a data packet that needs to be sent to the user equipment, where the protocol sequence number mapping information is specifically a mapping relationship between a network side protocol sequence number and a user side protocol sequence number that are of the data packet sent by the second network side device to the user equipment, or a network side protocol sequence number and a user side protocol sequence number that are of the data packet sent by the second network side device to the user equipment.

With reference to the second possible implementation manner, in a third possible implementation manner, the network side protocol sequence number is a General Packet Radio Service Tunnelling Protocol for the user plane GTP-U sequence number; and the user side protocol sequence number is a Packet Data Convergence Protocol PDCP sequence number.

With reference to the first aspect or any one possible implementation manner of the first possible implementation manner to the third possible implementation manner, in a fourth possible implementation manner, the selecting, by the user equipment from the at least one first network side device according to configuration information of the at least one first network side device, a first network side device that meets a first preset condition as a target network side device to communication with the user equipment specifically includes: measuring, by the user equipment, the at least one first network side device according to the configuration information of the at least one first network side device, to obtain at least one measurement result; and determining, by the user equipment according to the at least one measurement result and the first preset condition, the first network side device as the target network side device to communication with the user equipment.

With reference to the fourth possible implementation manner, in a fifth possible implementation manner, the first preset condition is delivered to the user equipment by the second network side device while the second network side device delivers the second preset condition.

With reference to the fourth possible implementation manner, in a sixth possible implementation manner, the first preset condition is determined by the user equipment according to a cell reselection criterion after the user equipment reads a network side system broadcast message.

With reference to the first aspect or any one possible implementation manner of the first possible implementation manner to the sixth possible implementation manner, in a seventh possible implementation manner, after the sending, by the user equipment to the first network side device, a message instructing the first network side device to provide a service for the user equipment, the method further includes: sending, by the user equipment to the second network side device, information instructing the second network side device to stop serving the user equipment, so that the second network side device stops sending the data packet to the user equipment.

With reference to the first aspect or any one possible implementation manner of the first possible implementation manner to the seventh possible implementation manner, in an eighth possible implementation manner, when the user equipment sends, to the first network side device, the message instructing the first network side device to provide a service for the user equipment, and does not send, to the second network side device, the message instructing the second network side device to stop serving the user equipment, the method further includes: receiving, by the user equipment, the data packet from the second network side device.

With reference to the first aspect or any one possible implementation manner of the first possible implementation manner to the eighth possible implementation manner, in a ninth possible implementation manner, before the selecting, by the user equipment from the at least one first network side device, a first network side device that meets a first preset condition as a target network side device to communication with the user equipment, the method further includes: receiving, by the user equipment, timing information with first duration from the second network side device, and before the first duration ends, saving configuration information of the second network side device, so that the user equipment can directly communicate with the second network side device before the first duration ends.

With reference to the ninth possible implementation manner, in a tenth possible implementation manner, the timing information is sent by the second network side device while the second network side device sends the configuration information of the at least one first network side device.

According to a second aspect, a method for transmitting a data packet is provided, including: after receiving a handover command message that is of a second network side device and that is for user equipment, completing, by a first network side device, admission control, and receiving a data packet for the user equipment, where the at least one first network side device is a candidate target network side device that is determined by the second network side device and that is for communication with the user equipment that meets a second preset condition, and the data packet for the user equipment is sent by a service gateway to both the first network side device and the second network side device; and sending, by the first network side device, the data packet to the user equipment after receiving, from the user equipment, a message instructing the first network side device to provide a service for the user equipment, where the message instructing the first network side device to provide a service for the user equipment is sent by the user equipment after the user equipment determines that the first network side device meets a first preset condition.

With reference to the second aspect, in a first possible implementation manner, the sending, by the first network side device, the data packet to the user equipment after receiving, from the user equipment, a message instructing the first network side device to provide a service for the user equipment specifically includes: determining, by the first network side device according to protocol sequence number mapping information of the data packet that is for the user equipment and that is sent by the second network side device, a user side protocol sequence number sent by the user equipment and of the last data packet that is received by the user equipment before the user equipment communicates with the first network side device or a user side protocol sequence number sent by the user equipment and of a data packet that the user equipment expects to receive next time, and a network side protocol sequence number of the data packet received by the first network side device, a user side protocol sequence number of a data packet that needs to be sent to the user equipment, where the protocol sequence number mapping information is specifically a mapping relationship between a network side protocol sequence number and a user side protocol sequence number that are of the data packet sent by the second network side device to the user equipment, or a network side protocol sequence number and a user side protocol sequence number that are of the data packet sent by the second network side device to the user equipment; and sending, by the first network side device, the data packet to the user equipment according to the user side protocol sequence number.

With reference to the first possible implementation manner, in a second possible implementation manner, the network side protocol sequence number is a General Packet Radio Service Tunnelling Protocol for the user plane GTP-U sequence number; and the user side protocol sequence number is a Packet Data Convergence Protocol PDCP sequence number.

According to a third aspect, a method for selecting a target network side device is provided, including: receiving, by a second network side device from a service gateway, a data packet for user equipment, where the data packet is sent by the service gateway to both the second network side device and at least one first network side device, and the at least one first network side device is a candidate target network side device that is determined by the second network side device and that is for communication with the user equipment that meets a second preset condition; and sending, by the second network side device, configuration information of the at least one first network side device to the user equipment after receiving, from the service gateway, an indication indicating that the data packet is concurrently sent successfully, so that the user equipment can directly communicate with the first network side device.

With reference to the third aspect, in a first possible implementation manner, before the sending, by the second network side device, configuration information of the at least one first network side device to the user equipment, the method further includes: sending, by the second network side device, protocol sequence number mapping information of the data packet for the user equipment to the first network side device, so that the first network side device determines, according to the protocol sequence number mapping information, a user side protocol sequence number sent by the user equipment and of the last data packet that is received by the user equipment before the user equipment communicates with the first network side device or a user side protocol sequence number sent by the user equipment and of a data packet that the user equipment expects to receive next time, and a network side protocol sequence number of the data packet received by the first network side device, a user side protocol sequence number of a data packet that needs to be sent to the user equipment, where the protocol sequence number mapping information is specifically a mapping relationship between a network side protocol sequence number and a user side protocol sequence number that are of the data packet sent by the second network side device to the user equipment, or a network side protocol sequence number and a user side protocol sequence number that are of the data packet sent by the second network side device to the user equipment.

With reference to the first possible implementation manner, in a second possible implementation manner, the network side protocol sequence number is a General Packet Radio Service Tunnelling Protocol for the user plane GTP-U sequence number; and the user side protocol sequence number is a Packet Data Convergence Protocol PDCP sequence number.

With reference to the third aspect, the first possible implementation manner, or the second possible implementation manner, in a third possible implementation manner, after the sending, by the second network side device, configuration information of the at least one first network side device to the user equipment, the method further includes: receiving, by the second network side device from the user equipment, information instructing the second network side device to stop serving the user equipment, and stopping sending the data packet to the user equipment.

With reference to the third aspect or any one possible implementation manner of the first possible implementation manner to the third possible implementation manner, in a fourth possible implementation manner, the method further includes: after receiving, from the user equipment, the information instructing the second network side device to stop serving the user equipment, sending, by the second network side device, a data bearer teardown indication to a mobility control node, so that the mobility control node instructs the service gateway to stop sending the data packet for the user equipment to the second network side device.

With reference to the fourth possible implementation manner, in a fifth possible implementation manner, the sending, by the second network side device, a data bearer teardown indication to a mobility control node specifically includes: after second duration ends, sending, by the second network side device, the data bearer teardown indication to the mobility control node, so that the mobility control node instructs the service gateway to stop sending the data packet for the user equipment to the second network side device.

With reference to the third aspect or any one possible implementation manner of the first possible implementation manner to the fifth possible implementation manner, in a sixth possible implementation manner, the method further includes: after determining the at least one first network side device as the candidate target network side device to communication with the user equipment, saving, by the second network side device, configuration information of the user equipment before a configuration saving time ends, and separately sending the configuration saving time to the user equipment and the at least one first network side device.

With reference to the sixth possible implementation manner, in a seventh possible implementation manner, the configuration saving time is carried in a handover command message and is sent to the at least one first network side device.

With reference to the sixth possible implementation manner or the seventh possible implementation manner, in an eighth possible implementation manner, the configuration saving time is carried in the configuration information of the at least one first network side device and is sent to the user equipment.

With reference to the sixth possible implementation manner, the seventh possible implementation manner, or the eighth possible implementation manner, in a ninth possible implementation manner, the method further includes: sending, by the second network side device, timing information with first duration to the user equipment, so that the user equipment saves configuration information of the second network side device within the first duration after receiving the timing information.

According to a fourth aspect, a method for transmitting a data packet is provided, including: determining, by a service gateway, a data packet that needs to be sent to user equipment; and sending, by the service gateway to both at least one first network side device and a second network side device, the data packet that needs to be sent to the user equipment, where the at least one first network side device is a candidate target network side device that is determined by the second network side device for the user equipment that meets a second preset condition and that is for communication with the user equipment that meets a second preset condition, and the second network side device is a network side device to which the user equipment is currently connected.

With reference to the fourth aspect, in a first possible implementation manner, the sending, by the service gateway to at least one first network side device, the data packet that needs to be sent to the user equipment specifically includes: concurrently sending, by the service gateway to the at least one first network side device according to transmission layer address information that is of the at least one first network side device and that is obtained by using a mobility control node, the data packet that needs to be sent to the user equipment.

According to a fifth aspect, a method for saving configuration information is provided, including: determining, by a second network side device, at least one first network side device as a candidate target network side device to communication with user equipment, where the second network side device is a network side device to which the user equipment is currently connected; and saving, by the second network side device, configuration information of the user equipment before a configuration saving time ends, and separately sending the configuration saving time to the user equipment and the at least one first network side device.

With reference to the fifth aspect, in a first possible implementation manner, the configuration saving time is carried in a handover command message sent by the second network side device and is sent to the at least one first network side device.

According to a sixth aspect, a method for saving configuration information is provided, including: receiving, by user equipment, timing information with first duration from a second network side device, where the second network side device is a network side device to which the user equipment is currently connected; and saving, by the user equipment, configuration information of the second network side device within the first duration, so that before the first duration ends, the user equipment can directly connect to the second network side device and communicate with the second network side device.

According to a seventh aspect, an apparatus for selecting a target network side device is provided, including: a target network side device determining module, configured to: after at least one first network side device completes admission control and receives a data packet for user equipment, select, from the at least one first network side device according to configuration information of the at least one first network side device, a first network side device that meets a first preset condition as a target network side device to communication with the user equipment, where the at least one first network side device is a candidate target network side device that is determined by a second network side device and that is for communication with the user equipment that meets a second preset condition; and a service indication sending module, configured to send, to the first network side device, a message instructing the first network side device to provide a service for the user equipment, so that the first network side device sends the data packet to the user equipment.

With reference to the seventh aspect, in a first possible implementation manner, the data packet for the user equipment is sent by a service gateway to both the at least one first network side device and the second network side device.

With reference to the seventh aspect or the first possible implementation manner, in a second possible implementation manner, the apparatus further includes: a user side protocol sequence number sending module, configured to: after the user equipment selects, from the at least one first network side device according to the configuration information of the at least one first network side device, the first network side device that meets the first preset condition as the target network side device to communication with the user equipment, send, to the first network side device, a user side protocol sequence number of the last data packet that is received by the user equipment before the user equipment communicates with the first network side device or a user side protocol sequence number of a data packet that the user equipment expects to receive next time, so that the first network side device can determine, according to the user side protocol sequence number, protocol sequence number mapping information of the data packet that is from the second network side device and that is for the user equipment, and a network side protocol sequence number of the data packet received by the first network side device, a user side protocol sequence number of a data packet that needs to be sent to the user equipment, where the protocol sequence number mapping information is specifically a mapping relationship between a network side protocol sequence number and a user side protocol sequence number that are of the data packet sent by the second network side device to the user equipment, or a network side protocol sequence number and a user side protocol sequence number that are of the data packet sent by the second network side device to the user equipment.

With reference to the second possible implementation manner, in a third possible implementation manner, the network side protocol sequence number is a General Packet Radio Service Tunnelling Protocol for the user plane GTP-U sequence number; and the user side protocol sequence number is a Packet Data Convergence Protocol PDCP sequence number.

With reference to seventh aspect or any one possible implementation manner of the first possible implementation manner to the third possible implementation manner, in a fourth possible implementation manner, the target network side device determining module specifically includes: a measurement module, configured to measure the at least one first network side device according to the configuration information of the at least one first network side device, to obtain at least one measurement result; and a determining module, configured to determine, according to the at least one measurement result and the first preset condition, the first network side device as the target network side device to communication with the user equipment.

With reference to the fourth possible implementation manner, in a fifth possible implementation manner, the first preset condition is delivered to the measurement module by the second network side device while the second network side device delivers the second preset condition.

With reference to the fifth possible implementation manner, in a sixth possible implementation manner, the first preset condition is determined by the measurement module according to a cell reselection criterion after the measurement module reads a network side system broadcast message.

With reference to the seventh aspect or any one possible implementation manner of the first possible implementation manner to the sixth possible implementation manner, in a seventh possible implementation manner, the service indication sending module is further configured to: after the user equipment sends, to the first network side device, a message instructing the first network side device to provide a service for the user equipment, send, to the second network side device, information instructing the second network side device to stop serving the user equipment, so that the second network side device stops sending the data packet to the user equipment.

With reference to the seventh aspect or any one possible implementation manner of the first possible implementation manner to the seventh possible implementation manner, in an eighth possible implementation manner, the apparatus further includes: a data packet receiving module, configured to: when the user equipment sends, to the first network side device, the message instructing the first network side device to provide a service for the user equipment, and does not send, to the second network side device, the message instructing the second network side device to stop serving the user equipment, receive the data packet from the second network side device.

With reference to the seventh aspect or any one possible implementation manner of the first possible implementation manner to the eighth possible implementation manner, in a ninth possible implementation manner, the apparatus further includes: a timing information receiving module, configured to: before the user equipment selects, from the at least one first network side device, the first network side device that meets the first preset condition as the target network side device to communication with the user equipment, receive timing information with first duration from the second network side device, and before the first duration ends, save configuration information of the second network side device, so that the user equipment can directly communicate with the second network side device before the first duration ends.

With reference to the ninth possible implementation manner, in a tenth possible implementation manner, the timing information is sent by the second network side device while the second network side device sends the configuration information of the at least one first network side device.

According to an eighth aspect, an apparatus for transmitting a data packet is provided, including: a service preparation module, configured to: after a handover command message that is of a second network side device and that is for user equipment is received, complete admission control, and receive a data packet for the user equipment, where the data packet for the user equipment is sent by a service gateway to both the service preparation module and the second network side device; and a data packet sending module, configured to send the data packet to the user equipment after a first network side device receives, from the user equipment, a message instructing the first network side device to provide a service for the user equipment, where the message instructing the first network side device to provide a service for the user equipment is sent by the user equipment after the user equipment determines that the first network side device meets a first preset condition.

With reference to the eighth aspect, in a first possible implementation manner, the data packet sending module specifically includes: a user side protocol sequence number determining module, configured to determine, according to protocol sequence number mapping information of the data packet that is for the user equipment and that is sent by the second network side device, a user side protocol sequence number sent by the user equipment and of the last data packet that is received by the user equipment before the user equipment communicates with the first network side device or a user side protocol sequence number sent by the user equipment and of a data packet that the user equipment expects to receive next time, and a network side protocol sequence number of the data packet received by the first network side device, a user side protocol sequence number of a data packet that needs to be sent to the user equipment, where the protocol sequence number mapping information is specifically a mapping relationship between a network side protocol sequence number and a user side protocol sequence number that are of the data packet sent by the second network side device to the user equipment, or a network side protocol sequence number and a user side protocol sequence number that are of the data packet sent by the second network side device to the user equipment; and a data packet sending submodule, configured to send the data packet to the user equipment according to the user side protocol sequence number.

With reference to the first possible implementation manner, in a second possible implementation manner, the network side protocol sequence number is a General Packet Radio Service Tunnelling Protocol for the user plane GTP-U sequence number; and the user side protocol sequence number is a Packet Data Convergence Protocol PDCP sequence number.

According to a ninth aspect, an apparatus for selecting a target network side device is provided, including: a data packet receiving module, configured to receive, from a service gateway, a data packet for user equipment, where the data packet is sent by the service gateway to both a second network side device and at least one first network side device; and a configuration information sending module, configured to send configuration information of the at least one first network side device to the user equipment after the second network side device receives, from the service gateway, an indication indicating that the data packet is concurrently sent successfully, so that the user equipment can directly communicate with the first network side device.

With reference to the ninth aspect, in a first possible implementation manner, the apparatus further includes: a protocol sequence number mapping information sending module, configured to: before the configuration information sending module sends the configuration information of the at least one first network side device to the user equipment, send protocol sequence number mapping information of the data packet for the user equipment to the first network side device, so that the first network side device determines, according to the protocol sequence number mapping information, a user side protocol sequence number sent by the user equipment and of the last data packet that is received by the user equipment before the user equipment communicates with the first network side device or a user side protocol sequence number sent by the user equipment and of a data packet that the user equipment expects to receive next time, and a network side protocol sequence number of the data packet received by the first network side device, a user side protocol sequence number of a data packet that needs to be sent to the user equipment, where the protocol sequence number mapping information is specifically a mapping relationship between a network side protocol sequence number and a user side protocol sequence number that are of the data packet sent by the second network side device to the user equipment, or a network side protocol sequence number and a user side protocol sequence number that are of the data packet sent by the second network side device to the user equipment.

With reference to the first possible implementation manner, in a second possible implementation manner, the network side protocol sequence number is a General Packet Radio Service Tunnelling Protocol for the user plane GTP-U sequence number; and the user side protocol sequence number is a Packet Data Convergence Protocol PDCP sequence number.

With reference to the ninth aspect, the first possible implementation manner, or the second possible implementation manner, in a third possible implementation manner, a service indication receiving module, configured to: after the configuration information sending module sends the configuration information of the at least one first network side device to the user equipment, receive, from the user equipment, information instructing the apparatus to stop serving the user equipment, and stop sending the data packet to the user equipment.

With reference to the ninth aspect or any one possible implementation manner of the first possible implementation manner to the third possible implementation manner, in a fourth possible implementation manner, the apparatus further includes: a data bearer teardown indication sending module, configured to: after the service indication receiving module receives, from the user equipment, the information instructing the apparatus to stop serving the user equipment, send a data bearer teardown indication to a mobility control node, so that the mobility control node instructs the service gateway to stop sending the data packet for the user equipment to the data packet receiving module.

With reference to the fourth possible implementation manner, in a fifth possible implementation manner, the data bearer teardown indication sending module is specifically configured to: after second duration ends, send the data bearer teardown indication to the mobility control node, so that the mobility control node instructs the service gateway to stop sending the data packet for the user equipment to the second network side device.

With reference to the ninth aspect or any one possible implementation manner of the first possible implementation manner to the fifth possible implementation manner, in a sixth possible implementation manner, the apparatus further includes: a configuration information saving module, configured to: after the second network side device determines the at least one first network side device as the candidate target network side device to communication with the user equipment, save configuration information of the user equipment before a configuration saving time ends; and a configuration saving time sending module, configured to separately send the configuration saving time to the user equipment and the at least one first network side device.

With reference to the sixth possible implementation manner, in a seventh possible Implementation manner, the configuration saving time is carried in a handover command message and is sent to the at least one first network side device.

With reference to the sixth possible implementation manner or the seventh possible implementation manner, in an eighth possible implementation manner, the configuration saving time is carried in the configuration information of the at least one first network side device and is sent to the user equipment.

With reference to the sixth possible implementation manner, the seventh possible implementation manner, or the eighth possible implementation manner, in a ninth possible implementation manner, the apparatus further includes: a timing information sending module, configured to send timing information with first duration to the user equipment, so that the user equipment saves configuration information of the second network side device within the first duration after receiving the timing information.

According to a tenth aspect, an apparatus for transmitting a data packet is provided, including: a data packet determining module, configured to determine a data packet that needs to be sent to user equipment; and a data packet sending module, configured to send, to both at least one first network side device and a second network side device, the data packet that needs to be sent to the user equipment, where the at least one first network side device is a candidate target network side device that is determined by the second network side device for the user equipment that meets a second preset condition and that is for communication with the user equipment that meets a second preset condition, and the second network side device is a network side device to which the user equipment is currently connected.

With reference to the tenth aspect, in a first possible implementation manner, the data packet sending module is specifically configured to: concurrently send, to the at least one first network side device according to transmission layer address information that is of the at least one first network side device and that is obtained by using a mobility control node, the data packet that needs to be sent to the user equipment.

According to an eleventh aspect, an apparatus for saving configuration information is provided, including: a candidate network side device determining unit, determining at least one first network side device as a candidate target network side device to communication with user equipment, where a second network side device is a network side device to which the user equipment is currently connected; a configuration information saving module, configured to save configuration information of the user equipment before a configuration saving time ends; and a configuration saving time sending module, configured to separately send the configuration saving time to the user equipment and the at least one first network side device.

With reference to the eleventh aspect, in a first possible implementation manner, the configuration saving time is carried in a handover command message sent by the second network side device and is sent to the at least one first network side device.

According to a twelfth aspect, an apparatus for saving configuration information is provided, including: a timing information receiving module, configured to receive timing information with first duration from a second network side device, where the second network side device is a network side device to which user equipment is currently connected; and a configuration information saving module, configured to save configuration information of the second network side device within the first duration, so that before the first duration ends, the user equipment can directly connect to the second network side device and communicate with the second network side device.

According to a thirteenth aspect, user equipment is provided, including: a processor, configured to configured to: after at least one first network side device completes admission control and receives a data packet for user equipment, select, from the at least one first network side device according to configuration information of the at least one first network side device, a first network side device that meets a first preset condition as a target network side device to communication with the user equipment, where the at least one first network side device is a candidate target network side device that is determined by a second network side device and that is for communication with the user equipment that meets a second preset condition; and a transmitter, configured to send, to the first network side device, a message instructing the first network side device to provide a service for the user equipment, so that the first network side device sends the data packet to the user equipment.

With reference to the thirteenth aspect, in a first possible implementation manner, the data packet for the user equipment is sent by a service gateway to both the at least one first network side device and the second network side device.

With reference to the thirteenth aspect or the first possible implementation manner, in a second possible implementation manner, the transmitter is further configured to: after the user equipment selects, from the at least one first network side device according to the configuration information of the at least one first network side device, the first network side device that meets the first preset condition as the target network side device to communication with the user equipment, send, to the first network side device, a user side protocol sequence number of the last data packet that is received by the user equipment before the user equipment communicates with the first network side device or a user side protocol sequence number of a data packet that the user equipment expects to receive next time, so that the first network side device can determine, according to the user side protocol sequence number, protocol sequence number mapping information of the data packet that is from the second network side device and that is for the user equipment, and a network side protocol sequence number of the data packet received by the first network side device, a user side protocol sequence number of a data packet that needs to be sent to the user equipment, where the protocol sequence number mapping information is specifically a mapping relationship between a network side protocol sequence number and a user side protocol sequence number that are of the data packet sent by the second network side device to the user equipment, or a network side protocol sequence number and a user side protocol sequence number that are of the data packet sent by the second network side device to the user equipment.

With reference to the second possible implementation manner, in a third possible implementation manner, the network side protocol sequence number is a General Packet Radio Service Tunnelling Protocol for the user plane GTP-U sequence number; and the user side protocol sequence number is a Packet Data Convergence Protocol PDCP sequence number.

With reference to the thirteenth aspect or any one possible implementation manner of the first possible implementation manner to the third possible implementation manner, in a fourth possible implementation manner, the processor is specifically configured to: measure, by the user equipment, the at least one first network side device according to the configuration information of the at least one first network side device, to obtain at least one measurement result; and determine, by the user equipment according to the at least one measurement result and the first preset condition, the first network side device as the target network side device to communication with the user equipment.

With reference to the fourth possible implementation manner, in a fifth possible implementation manner, the first preset condition is delivered to the user equipment by the second network side device while the second network side device delivers the second preset condition.

With reference to the fourth possible implementation manner, in a sixth possible implementation manner, the first preset condition is determined by the user equipment according to a cell reselection criterion after the user equipment reads a network side system broadcast message.

With reference to the thirteenth aspect or any one possible implementation manner of the first possible implementation manner to the sixth possible implementation manner, in a seventh possible implementation manner, the transmitter is further configured to: after the user equipment sends, to the first network side device, a message instructing the first network side device to provide a service for the user equipment, send, to the second network side device, information instructing the second network side device to stop serving the user equipment, so that the second network side device stops sending the data packet to the user equipment.

With reference to the thirteenth aspect or any one possible implementation manner of the first possible implementation manner to the seventh possible implementation manner, in an eighth possible implementation manner, the user equipment further includes: a first receiver, configured to: when the user equipment sends, to the first network side device, the message instructing the first network side device to provide a service for the user equipment, and does not send, to the second network side device, the message instructing the second network side device to stop serving the user equipment, receive the data packet from the second network side device.

With reference to the thirteenth aspect or any one possible implementation manner of the first possible implementation manner to the eighth possible implementation manner, in a ninth possible implementation manner, the user equipment further includes: a second receiver, configured to: before the user equipment selects, from the at least one first network side device, the first network side device that meets the first preset condition as the target network side device to communication with the user equipment, receive timing information with first duration from the second network side device, and before the first duration ends, save configuration information of the second network side device, so that the user equipment can directly communicate with the second network side device before the first duration ends.

With reference to the ninth possible implementation manner, in a tenth possible implementation manner, the timing information is sent by the second network side device while the second network side device sends the configuration information of the at least one first network side device.

According to a fourteenth aspect, a network side device is provided, including: a processor, configured to complete admission control after the network side device receives a handover command message that is of a second network side device and that is for user equipment; a receiver, configured to receive a data packet for the user equipment, where the at least one network side device is a candidate target network side device that is determined by the second network side device and that is for communication with the user equipment that meets a second preset condition, and the data packet for the user equipment is sent by a service gateway to both the network side device and the second network side device; and a transmitter, configured to send the data packet to the user equipment after the receiver receives, from the user equipment, a message instructing the network side device to provide a service for the user equipment, where the message instructing the network side device to provide a service for the user equipment is sent by the user equipment after the user equipment determines that the network side device meets a first preset condition.

With reference to the fourteenth aspect, in a first possible implementation manner, the transmitter is specifically configured to determine, according to protocol sequence number mapping information of the data packet that is for the user equipment and that is sent by the second network side device, a user side protocol sequence number sent by the user equipment and of the last data packet that is received by the user equipment before the user equipment communicates with the network side device or a user side protocol sequence number sent by the user equipment and of a data packet that the user equipment expects to receive next time, and a network side protocol sequence number of the data packet received by the network side device, a user side protocol sequence number of a data packet that needs to be sent to the user equipment, and send the data packet to the user equipment according to the user side protocol sequence number, where the protocol sequence number mapping information is specifically a mapping relationship between a network side protocol sequence number and a user side protocol sequence number that are of the data packet sent by the second network side device to the user equipment, or a network side protocol sequence number and a user side protocol sequence number that are of the data packet sent by the second network side device to the user equipment.

With reference to the first possible implementation manner, in a second possible implementation manner, the network side protocol sequence number is a General Packet Radio Service Tunnelling Protocol for the user plane GTP-U sequence number; and the user side protocol sequence number is a Packet Data Convergence Protocol PDCP sequence number.

With reference to the fourteenth aspect, the first possible implementation manner, or the second possible implementation manner, in a third possible implementation manner, the receiver is further configured to receive, from a service gateway, a data packet for user equipment, where the data packet is sent by the service gateway to both the network side device and at least one first network side device, and the at least one first network side device is a candidate target network side device that is determined by the network side device and that is for communication with the user equipment that meets a second preset condition; and the transmitter is further configured to send configuration information of the at least one first network side device to the user equipment after the receiver receives, from the service gateway, an indication indicating that the data packet is concurrently sent successfully, so that the user equipment can directly communicate with the first network side device.

With reference to the third possible implementation manner, in a fourth possible implementation manner, the transmitter is further configured to: before the transmitter sends the configuration information of the at least one first network side device to the user equipment, send protocol sequence number mapping information of the data packet for the user equipment to the first network side device, so that the first network side device determines, according to the protocol sequence number mapping information, a user side protocol sequence number sent by the user equipment and of the last data packet that is received by the user equipment before the user equipment communicates with the first network side device or a user side protocol sequence number sent by the user equipment and of a data packet that the user equipment expects to receive next time, and a network side protocol sequence number of the data packet received by the first network side device, a user side protocol sequence number of a data packet that needs to be sent to the user equipment, where the protocol sequence number mapping information is specifically a mapping relationship between a network side protocol sequence number and a user side protocol sequence number that are of the data packet sent by the network side device to the user equipment, or a network side protocol sequence number and a user side protocol sequence number that are of the data packet sent by the network side device to the user equipment.

With reference to the fourth possible implementation manner, in a fifth possible implementation manner, the network side protocol sequence number is a General Packet Radio Service Tunnelling Protocol for the user plane GTP-U sequence number; and the user side protocol sequence number is a Packet Data Convergence Protocol PDCP sequence number.

With reference to the third possible implementation manner, the fourth possible implementation manner, or the fifth possible implementation manner, in a sixth possible implementation manner, the receiver is further configured to: after the transmitter sends the configuration information of the at least one first network side device to the user equipment, receive, from the user equipment, information instructing the network side device to stop serving the user equipment, and stop sending the data packet to the user equipment.

With reference to any one possible implementation manner of the third possible implementation manner to the sixth possible implementation manner, in a seventh possible implementation manner, the transmitter is further configured to: after the receiver receives, from the user equipment, the information instructing the network side device to stop serving the user equipment, send a data bearer teardown indication to a mobility control node, so that the mobility control node instructs the service gateway to stop sending the data packet for the user equipment to the network side device.

With reference to the seventh possible implementation manner, in an eighth possible implementation manner, the transmitter is specifically configured to: after second duration ends, send the data bearer teardown indication to the mobility control node, so that the mobility control node instructs the service gateway to stop sending the data packet for the user equipment to the network side device.

With reference to any one possible implementation manner of the third possible implementation manner to the eighth possible implementation manner, in a ninth possible implementation manner, the network side device further includes: a memory, configured to: after the network side device determines the at least one first network side device as the candidate target network side device to communication with the user equipment, save configuration information of the user equipment before a configuration saving time ends, where the transmitter is configured to separately send the configuration saving time to the user equipment and the at least one first network side device.

With reference to the ninth possible implementation manner, in a tenth possible implementation manner, the configuration saving time is carried in a handover command message and is sent to the at least one first network side device.

With reference to the ninth possible implementation manner or the tenth possible implementation manner, in an eleventh possible implementation manner, the configuration saving time is carried in the configuration information of the at least one first network side device and is sent to the user equipment.

With reference to the ninth possible implementation manner, the tenth possible implementation manner, or the eleventh possible implementation manner, in a twelfth possible implementation manner, the transmitter is further configured to send timing information with first duration to the user equipment, so that the user equipment saves configuration information of the network side device within the first duration after receiving the timing information.

According to a fifteenth aspect, a service gateway is provided, including: a transmitter, configured to determine a data packet that needs to be sent to user equipment; and further configured to send, by the service gateway to both at least one first network side device and a second network side device, the data packet that needs to be sent to the user equipment, where the at least one first network side device is a candidate target network side device that is determined by the second network side device for the user equipment that meets a second preset condition and that is for communication with the user equipment that meets a second preset condition, and the second network side device is a network side device to which the user equipment is currently connected.

With reference to the fifteenth aspect, in a first possible implementation manner, the transmitter is specifically configured to: concurrently send, to the at least one first network side device according to transmission layer address information that is of the at least one first network side device and that is obtained by using a mobility control node, the data packet that needs to be sent to the user equipment.

According to a sixteenth aspect, a network side device is provided, including: a processor, configured to determine at least one first network side device as a candidate target network side device to communication with user equipment, where the network side device is a network side device to which the user equipment is currently connected; a memory, configured to save configuration information of the user equipment before a configuration saving time ends; and a transmitter, configured to separately send the configuration saving time to the user equipment and the at least one first network side device.

With reference to the sixteenth aspect, in a first possible implementation manner, the configuration saving time is carried in a handover command message sent by the network side device and is sent to the at least one first network side device.

According to a seventeenth aspect, user equipment is provided, including: a receiver, configured to receive timing information with first duration from a second network side device, where the second network side device is a network side device to which the user equipment is currently connected; and a memory, configured to save configuration information of the second network side device within the first duration, so that before the first duration ends, the user equipment can directly connect to the second network side device and communicate with the second network side device.

Beneficial effects of the present invention are as follows:

In the embodiments of the present invention, during downlink data transmission, after at least one first network side device used as a candidate target network side device completes admission control and receives a data packet for user equipment, the user equipment selects, from the at least one first network side device according to configuration information of the first network side device, a first network side device that meets a first preset condition as a target network side device, and sends, to the selected first network side device, a message instructing the first network side device to provide a service for the user equipment, so that the first network side device can send the data packet to the user equipment, and provide a service for the user equipment. In this way, during handover between cells, the user equipment can directly instruct the target network side device to provide a service for the user equipment, and a long handover preparation process is not required, thereby implementing rapid handover, improving handover efficiency, and reducing call drops.

BRIEF DESCRIPTION OF THE DRAWINGS

FIG. 2 is a flowchart of a method for transmitting downlink data according to an embodiment of the present invention;

FIG. 3 is a flowchart of processing on a user equipment side according to an embodiment of the present invention;

FIG. 4 is a flowchart of processing on a first network side device side according to an embodiment of this application;

FIG. 5 is a flowchart of processing of a second network side device according to an embodiment of this application;

DETAILED DESCRIPTION

To resolve the technical problem in the prior art that user equipment cannot be rapidly handed over between cells, embodiments of the present invention provide a method and an apparatus for selecting a target network side device.

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The following describes exemplary implementation manners of the present invention in detail with reference to accompanying drawings.

Embodiment 1

Figure 1:
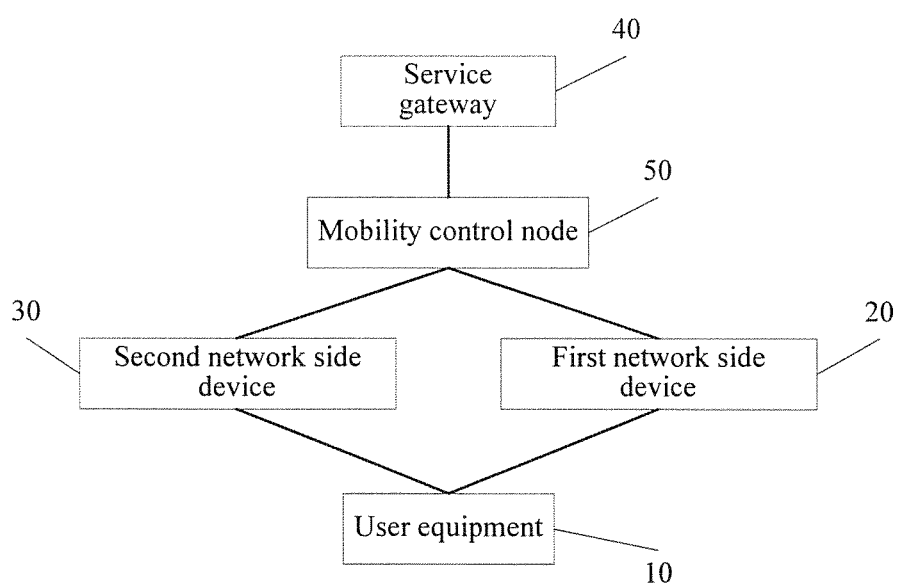
FIG. 1 is a functional block diagram of a system for implementing a method for transmitting downlink data according to an embodiment of the present invention.

As shown in FIG. 1, FIG. 1 is a functional block diagram of a system for implementing a method for transmitting downlink data according to an embodiment of the present invention. The system includes: user equipment 10, a first network side device 20, a second network side device 30, a service gateway 40, and a mobility control node 50.

The user equipment 10 is configured to: when at least one first network side device 20 meets a first preset condition after completing service preparation, select, from the at least one first network side device 20 according to configuration information of the at least one first network side device 20, a first network side device 20 as a target network side device for the user equipment 10 to perform communication, where the at least one first network side device 20 is a candidate target network side device that is determined by using the second network side device 30 by the user equipment 10 when the user equipment 10 meets a second preset condition and that is for the user equipment 10 to perform communication; and send, to the first network side device 20, a message instructing the first network side device 20 to provide a service for the user equipment 10, so that the first network side device 20 sends a data packet to the user equipment 10.

The first network side device 20 is configured to: after receiving a handover command message that is of the second network side device 30 and that is for the user equipment 10, complete service preparation according to the received data packet for the user equipment 10, where the handover command message is sent by the second network side device 30 that is triggered by the user equipment 10 after the user equipment 10 meets the second preset condition; and after receiving the message that is of the user equipment 10 and instructs the first network side device 20 to provide a service for the user equipment 10, send the data packet to the user equipment 10, where the message instructing the first network side device 20 to provide a service for the user equipment 10 is sent by the user equipment 10 after the user equipment 10 meets the first preset condition.

The second network side device 30 is a network side device to which the user equipment 10 is currently connected, may include a serving base station and/or an anchor, and is configured to: determine the at least one first network side device 20 as the candidate target network side device for the user equipment 10 to perform communication; and send configuration information of the at least one first network side device 20 to the user equipment 10, so that when the user equipment 10 meets the first preset condition, the user equipment 10 selects, from the at least one first network side device 20 according to the configuration information of the at least one first network side device 20, a first network side device 20 as a target network side device for communication and indicates the first network side device 20.

The service gateway 40 is configured to determine a data packet that needs to be sent to the user equipment 10; and send, to both the at least one first network side device 20 and the second network side device 30 that is to which the user equipment 10 is currently connected, the data packet that needs to be sent to the user equipment 10, where the at least one first network side device 20 is a candidate target network side device that is determined by using the second network side device 30 by the user equipment 10 when the user equipment 10 meets the second preset condition and that is for the user equipment 10 to perform communication.

The following describes, with reference to FIG. 1 and FIG. 2, the method for selecting a target network side device, and FIG. 2 is a flowchart of a method for transmitting downlink data according to an embodiment of the present invention.

After receiving measurement configuration that carries the second preset condition and that is delivered by the second network side device 30 to the user equipment 10, the user equipment 10 performs measurement, and reports a measurement report of the at least one first network side device 20 that meets the second preset condition to the second network side device 30, and the second network side device 30 makes a handover decision according to the measurement report, and sends the handover command message to the at least one first network side device 20, where these first network side devices 20 are candidate target network side devices for the user equipment 10 to perform communication.

It should be noted that, the second preset condition may be that signal strength of the first network side device 20 exceeds a first threshold, where the first threshold is 2 dB, 3 dB, or the like; or the second preset condition may be that signal strength of the first network side device 20 is greater than signal strength of the second network side device 30 by a first preset increment, for example, the first preset increment is 2 dB, 3 dB, or the like.

Further, to determine a candidate target base station with better signal strength, the second preset condition may also be that signal strength of the first network side device 20 exceeds the first threshold, and maintains the status for a period of time, for example, 1 second, 3 seconds, or 5 seconds, or that signal strength of the first network side device 20 is greater than signal strength of the second network side device 30 by the first preset increment, and maintains the status for a period of time, for example, 1 second, 3 seconds, or 5 seconds.

Certainly, the second preset condition may also be another condition, which is not limited in this application.

Next, after receiving the handover command message from the second network side device 30, the at least one first network side device 20 starts to perform admission control to allow the user equipment 10 to connect to the network side device.

Meanwhile, the service gateway 40 obtains transmission layer address information of the at least one first network side device 20 by using the mobility control node 50, and sends a same data packet to both the at least one first network side device 20 and the second network side device 30 according to the transmission layer address information. The mobility control node 50 obtains the transmission layer address information of the at least one first network side device 20 by using the at least one first network side device 20 or the second network side device 30.

Certainly, the at least one first network side device 20 may further receive the data packet from the second network side device 30, that is, the second network side device 30 forwards, to the at least one first network side device 20, the data packet sent by the service gateway 40.

In this embodiment, when the data packet received by the at least one first network side device 20 is from the service gateway 40, the data packet carries only a network side protocol sequence number, and when the data packet received by the at least one first network side device 20 is from the second network side device 30, the data packet carries a network side protocol sequence number and protocol sequence number mapping information. Certainly, the protocol sequence number mapping information may also be carried in handover command information sent by the second network side device 30 to the at least one first network side device 20 and is delivered, so that the data packet sent by the second network side device 30 to the at least one first network side device 20 may carry only the network side protocol sequence number of the data packet.

The protocol sequence number mapping information is specifically a mapping relationship between a network side protocol sequence number and a user side protocol sequence number that are of the data packet sent by the second network side device 30 to the user equipment 10, or a network side protocol sequence number and a user side protocol sequence number that are of the data packet sent by the second network side device 30 to the user equipment 10. As long as the protocol sequence number mapping information can reflect a mapping relationship between the network side protocol sequence number and the user side protocol sequence number that are of the data packet sent by the second network side device 30 to the user equipment 10, a specific form is not limited in this application.

Preferably, the network side protocol sequence number is a General Packet Radio Service Tunnelling Protocol for the user plane GTP-U sequence number (General Packet Radio Service Tunnelling Protocol-user plane), and the user side protocol sequence number is a sequence number of a PDCP. Certainly, the user side protocol sequence number may also be an RLC SN (radio link control layer protocol sequence number), or an IP SN (Internet Protocol Sequence number), which is not limited in this application.

For example, if one data packet whose GTP-U SN=2 and PDCP SN=3 is in multiple data packets sent by the second network side device 30 to the user equipment 10, the second network side device 30 may send a difference $\Delta SN=1$ between the two sequence numbers to the first network side device 20, or may send GTP-U SN=2 and PDCP SN=3 to the first network side device 20.

Further, after the service gateway 40 determines that the data packet can be concurrently sent to the at least one first network side device 20 and the second network side device 30, the service gateway 40 sends, to the second network side device 30, an indication indicating that the data packet is concurrently sent successfully, and the first network side device 20 sends handover response information to the second network side device 30. Then, after the second network side device 30 receives the indication and/or after the second network side device 30 receives the handover response information sent by the at least one first network side device 20, the second network side device 30 sends the configuration information of the at least one first network side device 20 to the user equipment 10, so that the user equipment 10 can directly communicate with the first network side device 20.

In this case, the at least one first network side device 20 completes the service preparation, and sends the handover response information to the second network side device 30. In actual application, a quantity of first network side devices 20 to which the second network side device 30 send a handover command message is greater than or equal to a quantity of first network side devices 20 that return a handover response message. That is, there may be a first network side device 20 that cannot admit the user equipment 10, which is subject to an actual situation, and is not limited in this application.

It should be noted that, in the foregoing process, after receiving, from the service gateway 40, the data packet for the user equipment 10, the second network side device 30 still sends the data packet to the user equipment 10.

Specifically, in this case, the user equipment 10 does not connect to the first network side device 20 yet; therefore, the user equipment 10 still maintains data communication with the second network side device 30, and the second network side device 30 sends, to the user equipment 10, the data packet sent by the service gateway 40, until the user equipment 10 is disconnected from the second network side device 30.

Next, the user equipment 10 starts to measure the at least one first network side device in real time, and when obtaining, through measurement, a first network side device 10 that meets the first preset condition, the user equipment 10 determines the first network side device 20 as the target network side device for communication.

The first preset condition may be that signal strength of the first network side device 20 exceeds a second threshold, where the second threshold is greater than the first threshold, for example, if the first threshold is 2 dB, the second threshold may be 3 dB, 4 dB, 10 dB, or the like; or the first preset condition is that signal strength of the first network side device 20 is greater than signal strength of the second network side device 30 by a second preset increment, where the second preset increment is greater than the first preset increment, for example, if the first preset increment is 2 dB, the second preset increment may be 3 dB, 5 dB, 10 dB, or the like. Certainly, as long as the first threshold and the first preset increment are respectively greater than the second threshold and the second preset increment, specific values of each threshold and each preset increment are subject to an actual situation, which is not specifically limited in this application.

Further, the first preset condition may also be that signal strength of the first network side device 20 exceeds the second threshold, and maintains the status for a period of time, for example, 1 second, or 3 seconds, or that signal strength of the first network side device 20 is greater than signal strength of the second network side device 30 by the second preset increment, and maintains the status for a period of time. By means of further filtering according to the first preset condition, the user equipment 10 can select, from the at least one first network side device 20, a most suitable first network side device 20 with best quality of service as the target network side device for communication.

Specifically, the user equipment 10 measures cells of the at least one first network side device 20 according to configuration information of the cells, for example, measuring RRM, CSI (channel state information), RLM, or an SINR (signal to interference plus noise ratio), to obtain at least one measurement result, and then, the user equipment 10 determines, from the at least one first network side device 20 according to the measurement result and the first preset condition, a first network side device 20 that meets the first preset condition as a target side device for the user equipment 10 to perform communication.

In this embodiment, the first preset condition may be delivered to the user equipment 10 by the second network side device 30 while the second network side device 30 delivers the second preset condition, or may be automatically determined by the user equipment 10 according to a cell reselection criterion after the user equipment 10 reads a system broadcast message of the second network side device 30, which is not specifically limited in this application.

Then, after the user equipment 10 determines the first network side device 20 as the target network side device for communication, the user equipment 10 sends, to the first network side device 20, information instructing the first network side device 20 to provide a service for the user equipment 10. That is, the user equipment 10 initiates a connection process to the first network side device 20 used as the target network side device, where the process may be specifically a random connection process, or a scheduling request process.

Optionally, the information instructing the first network side device 20 to provide a service for the user equipment 10 carries a user side protocol sequence number of the last data packet that is received by the user equipment 10 before the user equipment 10 connects to the first network side device 20, or a user side protocol sequence number of a data packet that the user equipment 10 expects to receive next time, which is not limited in this application.

After the first network side device 20 receives the information instructing the first network side device 20 to provide a service for the user equipment 10, the first network side device 20 determines, according to the protocol sequence number mapping information previously sent by the second network side device 30, the user side protocol sequence number sent by the user equipment 10, and the network side protocol sequence number carried in the data packet that is sent by the service gateway 40 or the second network side device 30 and received by the first network side device 20, a user side protocol sequence number of a data packet that needs to be sent to the user equipment 10.

For example, if the protocol sequence number mapping information is ΔSN=1 and the user side protocol sequence number sent by the user equipment 10 is PDCP SN=3, the first network side device 20 can determine that a GTP-U SN of the last data packet received from the second network side device 30 by the user equipment 10 equals 2, and the first network side device 20 can find, from the data packet sent by the service gateway 40, an initial data packet of a subsequent data packet that needs to be sent to the user equipment 10, that is, a data packet whose GTP-U SN=3.

Next, the first network side device 20 continues to send the data packet to the user equipment 10 according to the determined initial user side protocol sequence number, that is, providing a service for the user equipment 10.

Further, the user equipment 10 may further add one bitmap (bitmap) to the message instructing the first network side device 10 to provide a service for the user equipment 10, to indicate receiving statuses of several continuous packets starting from the user side protocol sequence number of the last received data packet or the user side protocol sequence number of the data packet that is expected to be received next time.

Specifically, when the user equipment 10 sends one bitmap (bitmap) to the first network side device 20 used as the target network side device, the first network side device 20 may choose, according to the bitmap, to send data packets that are not successfully received by the user equipment 10.

For example, if the protocol sequence number mapping information is SN=1, the user side protocol sequence number sent by the user equipment 10 is PDCP SN=3, and the bitmap is "01001", the first network side device 20 can determine that a GTP-U SN of the data packet that the user equipment 10 needs to receive next time equals 2, then, learn, according to the bitmap, receiving statuses of data packets following the data packet whose GTP-U SN=2, send data packets whose GTP-U SNs=2, 4, and 5 and that are not successfully received to the UE, and then continue to send a GTP-U data packet to the UE starting from GTP-U SN=7.

In this way, the user equipment 10 successfully connects to the first network side device 20; in this case, the user equipment 10 still receives a data packet from the second network side device 30.

In this embodiment, after the user equipment 10 connects to the first network side device 20, the second network side device 30 may still send the data packet to the user equipment 10, so that multiple network side devices serve the user equipment 10, or may be disconnected from the user equipment 10, and the user equipment 10 only receives a data packet from the first network side device 20, which is not limited in this application.

Further, after the user equipment 10 establishes a connection to the first network side device 20, the second network side device 30 needs to be disconnected from the user equipment 10; in this case, while sending the information instructing the first network side device 20 to provide a service for the user equipment 10 to the first network side device 20 used as the target network side device, the user equipment 10 sends, to the second network side device 30, information instructing the second network side device 30 to stop serving the user equipment 10.

In an implementation process, after receiving the information instructing the second network side device 30 to stop serving the user equipment 10, the second network side device 30 may immediately stop serving the user equipment 10, or may automatically start one timer, and before the timer times out, continue providing a service for the user equipment 10, so as to avoid service interruption caused by ping-pong handover, which is not specifically limited in this application.

In another embodiment, after receiving, from the user equipment 10, the information instructing the second network side device 30 to stop serving the user equipment 10, the second network side device 30 may further send a data bearer teardown indication to the mobility control node 50, so that the mobility control node 50 instructs the service gateway 40 to stop sending the data packet for the user equipment 10 to the second network side device 30.

In a specific implementation process, after receiving the information instructing the second network side device 30 to stop serving the user equipment 10, the second network side device 30 may immediately send the data bearer teardown indication to the mobility control node 50, or may send the data bearer teardown indication to the mobility control node 50 after second duration ends, where the second duration is duration automatically determined by the second network side device 30.

It should be noted that, both of the foregoing two messages, that is, the message instructing the first network side device 20 to provide a service for the user equipment 10 and the message instructing the second network side device 30 to stop serving the user equipment 10, may be sent to the second network side device 30, and then the second network side device 30 forwards, to the first network side device 20, the message instructing the first network side device 20 to provide a service for the user equipment 10; and both of the foregoing two messages may be also sent to the first network side device 20, and then the first network side device 20 forwards, to the second network side device 30, the message instructing the second network side device 30 to stop serving the user equipment 10, and then sends the message to the first network side device 20; or after receiving the message instructing the first network side device 20 to provide a service for the user equipment 10, the first network side device 20 sends, to the second network side device 30, the message instructing the second network side device 30 to stop serving the user equipment 10; on the contrary, after receiving the message instructing the second network side device 30 to stop serving the user equipment 10, the second network side device 30 sends, to the first network side device 20, the message instructing the first network side device 20 to provide a service for the user equipment 10, which is not specifically limited in this application.

In another embodiment, when delivering the second preset condition to the user equipment 10, or delivering the configuration information of the at least one first network side device 20, the second network side device 30 may further deliver timing information with first duration to the user equipment 10, so that before the first duration ends, the user equipment 10 saves configuration information of the second network side device 30. Then, in a subsequent handover process, the user equipment 10 can directly connect to and communicate with the second network side device 30 before the first duration ends, that is, if the user equipment 10 needs to connect to the second network side device 30, the user equipment 10 may directly initiate a connection process to the second network side device 30, and does not need the first network side device 20, which avoids a problem that because the user equipment 10 cannot communicate with the first network side device 20, the handover fails. Certainly, the first duration may also be pre-determined through negotiation between the user equipment 10 and the second network side device 30, which is not limited in this application.

Further, the second network side device 30 may further save configuration information of the user equipment 10 after determining the at least one first network side device 20 as the candidate target side device of the user equipment 10, and use a time for which the second network side device 30 saves the configuration information as a configuration saving time and separately send the configuration saving time to the user equipment 10 and the at least one first network side device 20. That is, before the configuration saving time ends, the second network side device 30 saves the configuration information of the user equipment 10, so that the first network side device 20 can connect the user equipment 10 to the second network side device 30 at any time before the configuration saving time ends, or the user equipment 10 can connect to the second network side device 30 at any time before the configuration saving time ends, to implement rapid handover of the user equipment 10 between the second network side device 30 and the at least one first network side device 20.

In specific application, the configuration saving time sent to the user equipment 10 may be carried in the configuration information that is of the at least one first network side device 20 and that is delivered by the second network side device 30 to the user equipment 10, and the configuration saving time sent to the at least one first network side device 20 may be carried in a handover command message that is delivered to the at least one first network side device 20 by the second network side device 30. Because times for delivering the configuration saving time are different, the configuration saving time delivered to the user equipment 10 and the configuration saving time delivered to the at least one first network side device 20 may be duration with different start points, but with aligned end points. In actual application, if the delivery times are the same, the configuration saving time delivered to the user equipment 10 and the configuration saving time delivered to the at least one first network side device 20 may be the same duration, and the specific duration is determined by a network side according to an actual case, which is not specifically limited in this application.

It should be noted that, the second network side device 30 may be specifically a serving base station, or may be a serving base station and an anchor. When the second network side device 30 is a serving base station and an anchor, in the foregoing process, a method step on a control plane is executed by the anchor, and the serving base station is configured to execute a method step on a data plane, that is, receive, from the service gateway 40, the data packet for the user equipment 10, and forward the data packet to the anchor, so that the anchor sends the data packet to the user equipment 10.

The following separately describes the foregoing method from the perspective of a device on each side in a system.

Embodiment 2

In this embodiment, the foregoing method is described from a user equipment side. Referring to FIG. 3, FIG. 3 is a flowchart of processing on a user equipment side according to an embodiment of the present invention.

Then, the method includes:

Step 301: After at least one first network side device completes admission control and receives a data packet for user equipment, the user equipment selects, from the at least one first network side device according to configuration information of the at least one first network side device, a first network side device that meets a first preset condition as a target network side device to communication with the user equipment, where the at least one first network side device is a candidate target network side device that is determined by a second network side device and that is for communication with the user equipment that meets a second preset condition.

Specifically, after the user equipment determines, by using the second network side device according to the second preset condition, the at least one first network side device as the candidate target network side device to communication with the user equipment, the user equipment receives configuration information of the at least one first network side device from the second network side device, and measures the at least one first network side device according to the configuration information, to obtain at least one measurement result, and then, the user equipment determines, according to the at least one measurement result and the first preset condition, the first network side device as the target network side device to communication with the user equipment.

The second preset condition may be that signal strength of the first network side device exceeds a first threshold, where the first threshold is 2 dB, 3 dB, or the like; or the second preset condition may be that signal strength of the first network side device is greater than signal strength of the second network side device by a first preset increment, for example, the first preset increment is 2 dB, 3 dB, or the like.

Further, to determine a candidate target base station with better signal strength, the second preset condition may also be that signal strength of the first network side device exceeds the first threshold, and maintains the status for a period of time, for example, 1 second, 3 seconds, or 5 seconds, or that signal strength of the first network side device is greater than signal strength of the second network side device by the first preset increment, and maintains the status for a period of time, for example, 1 second, 3 seconds, or 5 seconds. Certainly, the second preset condition may further be another condition, which is not limited in this application.

The first preset condition may be that signal strength of the first network side device exceeds a second threshold, where the second threshold is greater than the first threshold, for example, if the first threshold is 2 dB, the second threshold may be 3 dB, 4 dB, 10 dB, or the like; or the first preset condition is that signal strength of the first network side device is greater than signal strength of the second network side device by a second preset increment, where the second preset increment is greater than the first preset increment, for example, if the first preset increment is 2 dB, the second preset increment may be 3 dB, 5 dB, 10 dB, or the like. Certainly, as long as the first threshold and the first preset increment are respectively greater than the second threshold and the second preset increment, specific values of each threshold and of each preset increment are subject to an actual case, which is not specifically limited in this application.

Further, the first preset condition may also be that signal strength of the first network side device exceeds the second threshold, and maintains the status for a period of time, for example, 1 second, 3 seconds, or that signal strength of the first network side device is greater than signal strength of the second network side device by the second preset increment, and maintains the status for a period of time. By means of further filtering according to the first preset condition, the user equipment can select, from the at least one first network side device, a most suitable first network side device with best quality of service as the target network side device for communication.

Then, step 301 is specifically: the user equipment measures cells of the at least one first network side device according to configuration information of the cells, such as, measuring RRM, CSI, RLM, or an SINR, to obtain at least one measurement result, and then, the user equipment determines, from the at least one first network side device according to the measurement result and the first preset condition, the first network side device that meets the first preset condition as the target side device to communication with the user equipment.

In this embodiment, the first preset condition may be delivered to the user equipment by the second network side device while the second network side device delivers the second preset condition, or may be automatically determined by the user equipment according to a cell reselection criterion after the user equipment reads a system broadcast message of the second network side device, which is not specifically limited in this application.

Step 302: The user equipment sends, to the first network side device, a message instructing the first network side device to provide a service for the user equipment, so that the first network side device sends the data packet to the user equipment.

Specifically, the user equipment sends, to the first network side device, a user side protocol sequence number of the last data packet that is received by the user equipment before the user equipment communicates with the first network side device or a user side protocol sequence number of a data packet that the user equipment expects to receive next time, so that the first network side device can determine, according to the user side protocol sequence number, protocol sequence number mapping information of the data packet that is from the second network side device and that is for the user equipment, and a network side protocol sequence number of the data packet received by the first network side device, a user side protocol sequence number of a data packet that needs to be sent to the user equipment.

The protocol sequence number mapping information is specifically a mapping relationship between a network side protocol sequence number and a user side protocol sequence number that are of the data packet sent by the second network side device to the user equipment, or a network side protocol sequence number and a user side protocol sequence number that are of the data packet sent by the second network side device to the user equipment.

In this embodiment, the network side protocol sequence number is a sequence number of a GTP-U; and the user side protocol sequence number is a sequence number of a PDCP. Certainly, the user side protocol sequence number may also be an RLC SN (radio link control layer protocol sequence number), or an IP SN (Internet protocol sequence number), which is not limited in this application.

For example, if one data packet whose GTP-U SN=2 and PDCP SN=3 is in multiple data packets sent by the second network side device to the user equipment, the second network side device may send a difference ΔSN=1 between the two sequence numbers to the first network side device, or may send GTP-U SN=2 and PDCP SN=3 to the first network side device.

In actual application, the user side protocol sequence number, sent by the user equipment to the first network side device, of the last data packet that is received by the user equipment before the user equipment communicates with the first network side device or the data packet that the user equipment expects to receive next time may be carried in the message, sent by the user equipment to the first network side device, instructing the first network side device to provide a service for the user equipment.

Further, to avoid service interruption caused by ping-pong handover, after step 402, the method further includes: sending, by the user equipment to the second network side device, information instructing the second network side device to stop serving the user equipment, so that the second network side device stops sending the data packet to the user equipment.

In another embodiment, the user equipment may further provide a service for both the second network side device and the first network side device. Therefore, when the user equipment sends, to only the first network side device, a message instructing the first network side device to provide a service for the user equipment, and does not send, to the second network side device, the information instructing the second network side device to stop serving the user equipment, that is, when the user equipment already connects to the first network side device, and has not been disconnected from the second network side device, the user equipment still receives the data packet from the second network side device.

Further, before step 301, the method further includes: receiving, by the user equipment, timing information with first duration from the second network side device, and before the first duration ends, saving configuration information of the second network side device, so that before the first duration ends, the user equipment can directly communicate with the second network side device, that is, before the first duration ends, if the user equipment needs to connect to the second network side device, the user equipment may directly initiate a connection process to the second network side device, and does not need the first network side device, which avoids a problem that because the user equipment cannot communicate with the first network side device, the handover fails.

Preferably, the timing information is delivered by the second network side device while the second network side device delivers the second preset condition or the configuration information of the at least one first network side device to the user equipment, where the first duration may also be pre-determined through negotiation between the user equipment and the second network side device, which is not limited in this application.

Embodiment 3

In this embodiment, the foregoing method is described from a first network side device side, that is, a target network side device side. Referring to FIG. 4, FIG. 4 is a flowchart of processing on a first network side device side according to an embodiment of the present invention.

Then, the process includes:

Step 401: After receiving a handover command message that is of a second network side device and that is for user equipment, a first network side device completes admission control, and receives a data packet for the user equipment, where at least one first network side device is a candidate target network side device that is determined by the second network side device and that is for communication with the user equipment that meets a second preset condition, and the data packet for the user equipment is sent by a service gateway to both the first network side device and the second network side device.

Step 402: The first network side device sends the data packet to the user equipment after receiving, from the user equipment, a message instructing the first network side device to provide a service for the user equipment, where the message instructing the first network side device to provide a service for the user equipment is sent by the user equipment after the user equipment determines that the first network side device meets a first preset condition.

Specifically, the first network side device determines, according to protocol sequence number mapping information of the data packet that is for the user equipment and that is sent by the second network side device, a user side protocol sequence number sent by the user equipment and of the last data packet that is received by the user equipment before the user equipment communicates with the first network side device or a user side protocol sequence number sent by the user equipment and of a data packet that the user equipment expects to receive next time, and a network side protocol sequence number of the data packet received by the first network side device, a user side protocol sequence number of a data packet that needs to be sent to the user equipment, and then the first network side device sends the data packet to the user equipment according to the determined user side protocol sequence number.

The protocol sequence number mapping information is specifically a mapping relationship between a network side protocol sequence number and a user side protocol sequence number that are of the data packet sent by the second network side device to the user equipment, or a network side protocol sequence number and a user side protocol sequence number that are of the data packet sent by the second network side device to the user equipment. As long as the protocol sequence number mapping information can reflect a mapping relationship between the network side protocol sequence number and the user side protocol sequence number that are of the data packet sent by the second network side device to the user equipment, a specific form is not limited in this application.

Preferably, the network side protocol sequence number is a sequence number of a GTP-U, the user side protocol sequence number is a PDCP SN, and the user side protocol sequence number may be an RLC SN or an IP SN, which is not limited in this application.

For example, if one data packet whose GTP-U SN=2 and PDCP SN=3 is in multiple data packets sent by the second network side device to the user equipment, the second network side device may send a difference $\Delta SN=1$ between the two sequence numbers to the first network side device, or may send GTP-U SN=2 and PDCP SN=3 to the first network side device 20.

For example, if the protocol sequence number mapping information is $\Delta SN=1$, and the user side protocol sequence number sent by the user equipment is PDCP SN=3, the first network side device can determine that a GTP-U SN of the last data packet received from the second network side device by the user equipment equals 2, and the first network side device can find, from the data packet sent by the service gateway, an initial data packet of a subsequent data packet that needs to be sent to the user equipment, that is, a data packet whose GTP-U SN=3, and then, the first network side device sends the data packet whose GTP-U SN=3 to the user equipment.

Further, the user equipment may further add one bitmap (bitmap) to the message instructing the first network side device to provide a service for the user equipment, so that when the user equipment sends one bitmap (bitmap) to the first network side device used as the target network side device, the first network side device may choose, according to the bitmap, to send data packets that are not successfully received by the user equipment.

For example, if the protocol sequence number mapping information is SN=1, the user side protocol sequence number sent by the user equipment is PDCP SN=3, and the bitmap is "01001", the first network side device can determine that a GTP-U SN of the data packet that the user equipment needs to receive next time equals 2, then, learn, according to the bitmap, receiving statuses of data packets following the data packet whose GTP-U SN=2, send data packets whose GTP-U SNs=2, 4, and 5 and that are not successfully received to the user equipment, and then continue to send a GTP-U data packet to the user equipment starting from GTP-U SN=7.

Embodiment 4

In this embodiment, the foregoing method is described from a second network side device, that is, a source network side device. Referring to FIG. 5, FIG. 5 is a flowchart of processing of a second network side device according to an embodiment of the present invention.

Then, the process includes:

Step 501: A second network side device receives, from a service gateway, a data packet for user equipment, where the data packet is sent by the service gateway to both the second network side device and at least one first network side device, and the at least one first network side device is a candidate target network side device that is determine d by the second network side device and that is for communication with the user equipment that meets a second preset condition.

In this embodiment, the data packet received by the second network side device is sent by the service gateway to the at least one first network side device, so that after the user equipment connects to the first network side device, the first network side device can immediately send the data packet to and provide a service for the user equipment.

It should be noted that, the second preset condition may be that signal strength of the first network side device exceeds a first threshold, where the first threshold is 2 dB, 3 dB, or the like; or the second preset condition may be that signal strength of the first network side device is greater than signal strength of the second network side device by a first preset increment, for example, the first preset increment is 2 dB, 3 dB, or the like.

Further, to determine a candidate target base station with better signal strength, the second preset condition may also be that signal strength of the first network side device exceeds the first threshold, and maintains the status for a period of time, for example, 1 second, 3 seconds, or 5 seconds, or that signal strength of the first network side device is greater than signal strength of the second network side device by the first preset increment, and maintains the status for a period of time, for example, 1 second, 3 seconds, or 5 seconds.

Certainly, the second preset condition may also be another condition, which is not limited in this application.

Step 502: The second network side device sends configuration information of the at least one first network side device to the user equipment after receiving, from the service gateway, an indication indicating that the data packet is concurrently sent successfully, so that the user equipment can directly communicate with the first network side device.

Specifically, after concurrently sending the data packet to the second network side device and the at least one first network side device, the service gateway sends, to the second network side device, an indication indicating that the data packet is concurrently sent successfully, so that after receiving the indication, the second network side device sends the configuration information of the at least one first network side device to the user equipment, and the user equipment can directly connect, according to the configuration information, to the first network side device corresponding to the configuration information, and directly communicate with the first network side device.

Further, before step 502, the foregoing process further includes: sending, by the second network side device to the first network side device, protocol sequence number mapping information of the data packet for the user equipment, so that the first network side device determines, according to the protocol sequence number mapping information, a user side protocol sequence number sent by the user equipment and of the last data packet that is received by the user equipment before the user equipment communicates with the first network side device or a user side protocol sequence number sent by the user equipment and of a data packet that the user equipment expects to receive next time, and a network side protocol sequence number of the data packet received by the first network side device, a user side protocol sequence number of a data packet that needs to be sent to the user equipment.

The protocol sequence number mapping information is specifically a mapping relationship between a network side protocol sequence number and a user side protocol sequence number that are of the data packet sent by the second network side device to the user equipment, or a network side protocol sequence number and a user side protocol sequence number that are of the data packet sent by the second network side device to the user equipment.

Preferably, the network side protocol sequence number is a General Packet Radio Service Tunnelling Protocol for the user plane GTP-U sequence number; and the user side protocol sequence number is a Packet Data Convergence Protocol PDCP sequence number.

Further, after step 502, the foregoing process further includes: receiving, by the second network side device from the user equipment, information instructing the second network side device to stop serving the user equipment, and stopping sending the data packet to the user equipment.

Specifically, after the user equipment connects to the first network side device, the second network side device may still send the data packet to the user equipment, so that multiple network side devices serve the user equipment, or may be disconnected from the user equipment, so that the user equipment receives only a data packet from the first network side device. Therefore, if the user equipment wants to be disconnected from the second network side device, the user equipment sends, to the second network side device, information instructing the second network side device to stop serving the user equipment; in this case, the second network side device stops sending the data packet to the user equipment.

Further, after receiving, from the user equipment, the information instructing the second network side device to stop serving the user equipment, the second network side device may send a data bearer teardown indication to a mobility control node, so that the mobility control node instructs the service gateway to stop sending the data packet for the user equipment to the second network side device.

In a specific implementation process, after receiving the information instructing the second network side device to stop serving the user equipment, the second network side device may immediately send the data bearer teardown indication to the mobility control node, or may send the data bearer teardown indication to the mobility control node after second duration ends, where the second duration is duration automatically determined by the second network side device.

In another embodiment, the foregoing process further includes: after determining the at least one first network side device as the candidate target network side device to communication with user equipment, saving, by the second network side device, configuration information of the user equipment before a configuration saving time ends, and separately sending the configuration saving time to the user equipment and the at least one first network side device In this embodiment, the configuration saving time is carried in a handover command message and is sent to the at least one first network side device, where the handover command message is sent to the at least one first network side device after the second network side device determines the at least one first network side device according to a measurement report reported by the user equipment, so that the first network side device starts to perform connection control after receiving the handover command message, and receives, from the service gateway, the data packet for the user equipment. The configuration saving time sent to the user equipment is carried in the configuration information of the at least one first network side device. In this way, when the user equipment needs to provide a service for the second network side device again, the user equipment may directly connect to the second network side device, or the first network side device directly hands over the user equipment back to the second network side device, to implement rapid handover of the user equipment.

Certainly, to further ensure that the user equipment can be rapidly handed over between the first network side device and the second network side device, the second network side device may further send timing information with first duration to the user equipment, so that the user equipment saves configuration information of the second network side device within the first duration after receiving the timing information; in this way, the user equipment can directly connect to the second network side device, and does not need the first network side device, which avoids a problem that because the user equipment cannot communicate with the first network side device, the handover fails. Certainly, the first duration may also be determined by the user equipment itself, or may be set through negotiation between the user equipment and the second network side device, which is not limited in this application.

It should be noted that, the second network side device may be specifically a serving base station, or may be a serving base station and an anchor. When the second network side device is a second network side device and an anchor, in the foregoing process, a method step on a control plane is executed by the anchor, and the serving base station is only configured to execute a method step on a data plane, that is, receive, from the service gateway, a data packet for the user equipment, and forward the data packet to the anchor, so that the anchor sends the data packet to the user equipment.

Embodiment 5

In this embodiment, the foregoing method is described from a service gateway.

Figure 6:
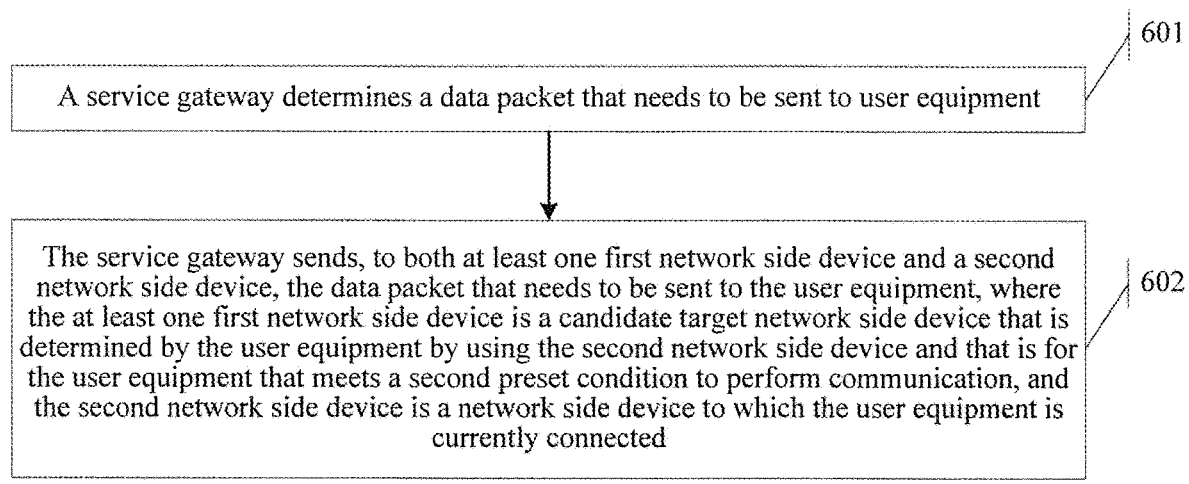
FIG. 6 is a flowchart of processing on a service gateway side according to an embodiment of this application.

Referring to FIG. 6, FIG. 6 is a flowchart of processing on a service gateway side according to an embodiment of the present invention.

Then, the process includes:

Step 601: A service gateway determines a data packet that needs to be sent to user equipment.

Specifically, the service gateway receives a data packet that is sent from a core network and that is for the user equipment, where the data packet is a data packet that needs to be sent to the user equipment.

Step 602: The service gateway sends, to both at least one first network side device and a second network side device, the data packet that needs to be sent to the user equipment, where the at least one first network side device is a candidate target network side device that is determined by the second network side device for the user equipment that meets a second preset condition and that is for communication with the user equipment that meets a second preset condition, and the second network side device is a network side device to which the user equipment is currently connected.

Specifically, the service gateway obtains transmission layer address information of the at least one first network side device by using a mobility control node, and sends a same data packet to both the at least one first network side device and the second network side device according to the transmission layer address information. The mobility control node obtains the transmission layer address information of the at least one first network side device by using the at least one first network side device or the second network side device, and concurrently sends the data packet to the second network side device and the first network side device according to the transmission layer address information, so that the first network side device sends the concurrently sent data packet to the user equipment after receiving, from the user equipment, the information instructing the first network side device to provide a service for the user equipment.

Figure 7:
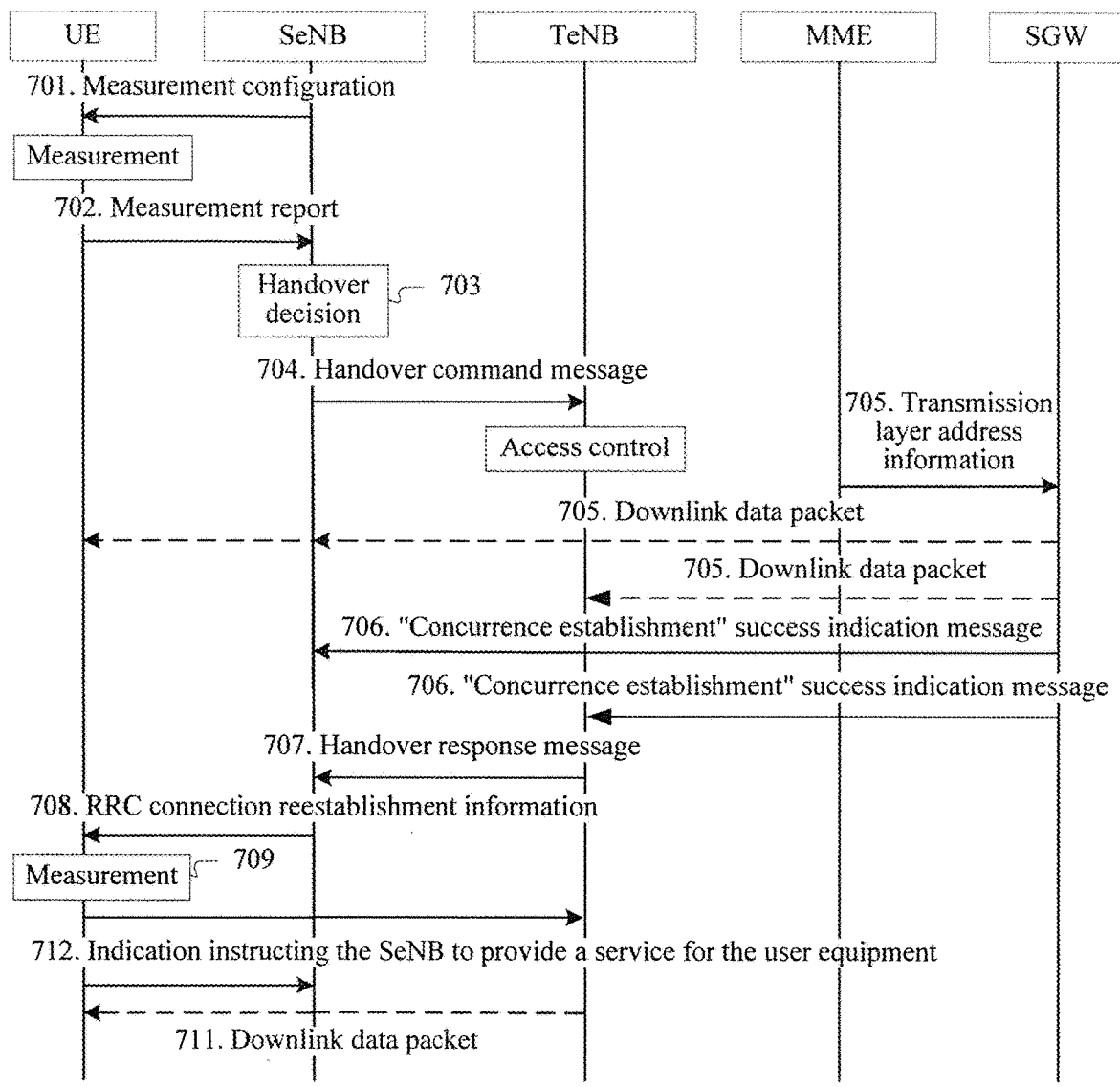
FIG. 7 is a flowchart of a method for transmitting downlink data in LTE according to an embodiment of this application.

The following describes a downlink data transmission method in the foregoing one or more embodiments by using LTE as an example and with reference to FIG. 7.

The user equipment UE may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks by using a radio access network (such as RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges language and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile terminal (Mobile), a remote station, an access point, a remote terminal, an access terminal, a user terminal, a user agent, a user device, or user equipment.

A first network side device TeNB and a second network side device SeNB may refer to devices that communicate with a radio terminal on an air interface in an access network by using one or more sectors. The network side device may be configured to perform interconversion on a received air frame and an IP packet, and is used as a router between the radio terminal and the rest part of the access network, where the rest part of the access network may include an Internet protocol (IP) network. The network side device may further coordinate attribute management on the air interface. For example, the network side device may be a base station (BTS, Base Transceiver Station) in CDMA, may be a base station (NodeB) in WCDMA, or may be an evolved Node B (NodeB or eNB or e-NodeB, evolved Node B) in LTE, which is not limited in this application.

In addition to a source serving base station that currently provides a service for the UE, the SeNB may further include an anchor; in this case, the source serving base station that provides a service for the UE executes a method process on a data plane, and the anchor executes a method process on a control plane. In this embodiment, the SeNB is only a serving base station that currently provides a service for the UE.

The service gateway may be an SGW in LTE, or may be an SGSN (service general packet radio service support node) in GSM or UMTS, which is not limited in this application.

The mobility control node may be an MME in LTE, or may be a GGSN (gateway general packet radio service support node) in GSM or UMTS, which is not limited in this application.

Step 701: The SeNB delivers measurement configuration to the UE, where the measurement configuration includes a second preset condition, that is, signal strength of the TeNB is greater than signal strength of the SeNB by 2 dB.

Step 702: The UE reports, according to the measurement configuration, a measurement report of at least one TeNB that meets the second preset condition to the SeNB.

Step 703: After receiving the measurement report, the SeNB makes a handover decision according to the measurement report and radio resource management information (RRM).

Step 704: The SeNB sends a handover command message to the at least one TeNB, and requests the at least one TeNB to execute connection control, where the handover command message may further carry protocol sequence number mapping information of a data packet of the SeNB for the UE, such as a data packet whose GTP-U SN=2 and PDCP SN=3 in multiple data packets sent by the SeNB to the UE, and then the SeNB sends a difference ΔSN=1 between the foregoing two sequence numbers to the at least one TeNB.

In another embodiment, when sending the handover command message to the at least one TeNB, the SeNB may add a configuration saving time to the handover command message, to notify the at least one TeNB that before the configuration saving time ends, the SeNB saves configuration information of the UE, so that the TeNB hands over the UE back to the SeNB. After the at least one TeNB receives the handover command message sent by the SeNB, the TeNB knows that before the configuration saving time ends, the SeNB saves the configuration information of the UE, and then the TeNB may directly hand over the UE back to the SeNB within the configuration saving time, to implement rapid handover of the UE between the SeNB and the TeNB.

Step 705: The SGW obtains, from the MME, transmission layer address information of the at least one TeNB, and concurrently sends a same data packet to both the SeNB and the at least one TeNB.

Step 706: The SGW sends a "concurrence establishment" success indication message to the SeNB and the at least one TeNB.

Step 707: After receiving the "concurrence establishment" success indication message, the at least one TeNB sends handover response information to the SeNB, to notify the SeNB that the at least one TeNB is prepared.

Step 708: After receiving the "concurrence establishment" success indication message, and receiving the handover response information from the TeNB, the SeNB delivers RRC connection reestablishment information to the UE, where the information carries configuration information of cells of the at least one TeNB, and the information can enable the UE to directly initiate a connection process to the cells of the at least one TeNB subsequently.

Optionally, the SeNB may further add a configuration saving time to the configuration information of the cells of the at least one TeNB, to notify the UE that before the configuration saving time ends, the SeNB saves the configuration information of the UE, and further to instruct the UE to save the configuration information of the SeNB before the configuration saving information ends. In this way, before the configuration saving information time ends, when handover of the UE fails or when quality of the SeNB becomes better after the UE is successfully handed over to the TeNB, the UE may re-connect to the SeNB.

In another embodiment, the SeNB may further deliver timing information with first duration to the UE in step 701 or step 708, and after receiving the timing information, the UE triggers a preset timer T1, and saves configuration information of the SeNB, so that before the first duration ends, the UE can directly connect to the SeNB, and communicate with the SeNB.

Step 709: The UE measures the cells of the at least one TeNB according to the received configuration information of the cells, and determines, according to a measurement result, a target network side device that the UE finally needs to connect to.

Specifically, after receiving the configuration information of the cells of the at least one TeNB, the UE immediately measures the cells according to configuration of cells of the SeNB and the configuration information of the cells of the at least one TeNB, for example, measuring RRM, CSI, RLM, an SINR, or the like, to obtain multiple measurement results, and then determines, according to the measurement results and the first preset condition, one TeNB in the at least one TeNB as a final target side device for UE handover, for example, the first preset condition is signal strength of the TeNB is greater than signal strength of the SeNB by 3 dB, that is, after receiving the configuration information of the at least one TeNB, the UE finds, from the at least one TeNB according to the first preset condition, a TeNB that is most suitable for the UE to connect to.

The first preset condition may be that signal strength of the TeNB exceeds a second threshold, where the second threshold is greater than the first threshold, for example, if the first threshold is 2 dB, the second threshold may be 3 dB, 4 dB, 10 dB, or the like; or the first preset condition is that signal strength of the TeNB is greater than signal strength of the SeNB by a second preset increment, where the second preset increment is greater than the first preset increment, for example, if the first preset increment is 2 dB, the second preset increment may be 3 dB, 5 dB, 10 dB, or the like. Certainly, as long as the first threshold and the first preset increment are respectively greater than the second threshold and the second preset increment, specific values of each threshold and each preset increment are subject to an actual case, which is not specifically limited in this application.

Further, the first preset condition may also be that signal strength of the TeNB exceeds the second threshold, and maintains the status for a period of time, for example, 1 second, or 3 seconds, or that signal strength of the TeNB is greater than signal strength of the SeNB by the second preset increment, and maintains the status for a period of time. By means of further filtering according to the first preset condition, the UE can select, from the at least one TeNB, a most suitable TeNB with best quality of service as the target network side device for handover.

Step 710: The UE sends, to the selected TeNB, a message instructing the TeNB to provide a service for the UE, where the message carries a user side protocol sequence number of the last data packet that is received by the UE from the SeNB before the UE is handed over or a user side protocol sequence number of a data packet that the UE expects to receive next time, and determines, according to the protocol sequence number mapping information of the data packet that is for the UE and that is sent by the SGW, the user side protocol sequence number sent by the UE and of the last data packet that is received by the UE before the UE is handed over or the user side protocol sequence number sent by the UE and of a data packet that the UE expects to receive next time, and a network side protocol sequence number of the data packet received by the TeNB, a user side protocol sequence number of a data packet that needs to be sent to the UE.

For example, if the protocol sequence number mapping information is ΔSN=1, and the user side protocol sequence number sent by the UE is PDCP SN=3, the TeNB can determine that a GTP-U SN of the last data packet received from the SeNB by the UE equals 2, and the TeNB can find, from the data packet sent by the SGW, an initial data packet of a subsequent data packet that needs to be sent to the UE, that is, a data packet whose GTP-U SN=3, and then, the TeNB sends the data packet whose GTP-U SN=3 to the UE.

Optionally, the UE 10 may further add one bitmap (bitmap) to the message instructing the TeNB to provide a service for the UE, to indicate receiving statuses of several continuous packets starting from the user side protocol sequence number of the last received data packet or the user side protocol sequence number of the data packet that is expected to be received next time.

Specifically, when the UE sends one bitmap (bitmap) to the TeNB used as the target network side device, the TeNB may choose, according to the bitmap, to send data packets that are not successfully received by the UE.

For example, if the protocol sequence number mapping information is ΔSN=1, the user side protocol sequence number sent by the UE is PDCP SN=3, and the bitmap is "01001", the TeNB can determine that a GTP-U SN of the data packet that the UE needs to receive equals 2, then, learn, according to the bitmap, receiving statuses of data packets after the data packet whose GTP-U SN=2, send data packets whose GTP-U SNs=2, 4, and 5 and that are not successfully received to the UE, and then continue to send a GTP-U data packet to the UE starting from GTP-U SN=7.

Step 711: The TeNB re-encapsulates the determined initial data packet according to a user side protocol, and forwards the initial data packet to the UE.

In this way, the UE successfully connects to the TeNB, and the TeNB provides a service for the UE.

Optionally, while or after step 710 is performed, step 712 may further be performed: The UE sends, to the SeNB, a message instructing the SeNB to stop serving the UE.

Specifically, after the SeNB receives, from the UE, the message instructing the SeNB to stop serving the UE, the SeNB immediately stops serving the UE, that is, stops sending the data packet to the UE.

Optionally, to avoid service interruption caused by ping-pong handover, after receiving the message instructing the SeNB to stop serving the UE, the SeNB may automatically start a timer T2, where T2 has third duration. Therefore, if before the third duration ends, the SeNB does not receive, from the UE, the message instructing the SeNB to provide a service for the UE, the SeNB stops serving the UE when the third duration ends.

In another embodiment, after receiving the message instructing the SeNB to stop serving the UE, the SeNB sends a data bearer teardown indication to the MME, and after receiving the indication, the MME sends a data bearer teardown message to the SGW, so that after receiving the message, the SGW no longer sends the data packet of the UE to the SeNB.

Preferably, to enable the UE to rapidly re-connect to the SeNB after connecting to the TeNB, the SeNB starts a preset timer T3 after receiving the message instructing the SeNB to stop serving the UE, where the timer T3 has second duration, and then, after the second duration ends, the SeNB sends the data bearer teardown indication to the MME, and releases context of the UE. If before the second duration ends, the UE needs to re-connect to the SeNB, step 710 is performed.

It should be noted that, both of the two messages in step 710 and step 712 may be further sent to the SeNB, and then the SeNB forwards, to the TeNB, the message instructing the TeNB to provide a service for the UE; or both of the two messages may be sent to the TeNB, and then the TeNB forwards, to the SeNB, the message instructing the SeNB to stop serving the UE; or only step 710 is performed, and after receiving the message, the TeNB sends, to the SeNB, the message instructing the SeNB to stop serving the UE; vice versa, only step 712 is performed, and after receiving the message, the SeNB sends, to the TeNB, the message instructing the TeNB to provide a service for the UE, which is not specifically limited in this application.

It can be seen from the foregoing one or more embodiments that, during downlink data transmission, after at least one first network side device used as a candidate target network side device completes admission control and receives a data packet for user equipment, the user equipment selects, from the at least one first network side device according to configuration information of the first network side device, a first network side device that meets a first preset condition as a target network side device, and sends, to the selected first network side device, a message instructing the first network side device to provide a service for the user equipment, so that the first network side device can send the data packet to the user equipment, and provide a service for the user equipment. In this way, during handover between cells, the user equipment can directly instruct the target network side device to provide a service for the user equipment, and a long handover preparation process is not required, thereby implementing rapid handover, improving handover efficiency, and reducing call drops.

Embodiment 6

Based on the same invention concept, this application further provides a method for saving configuration information.

Figure 8:
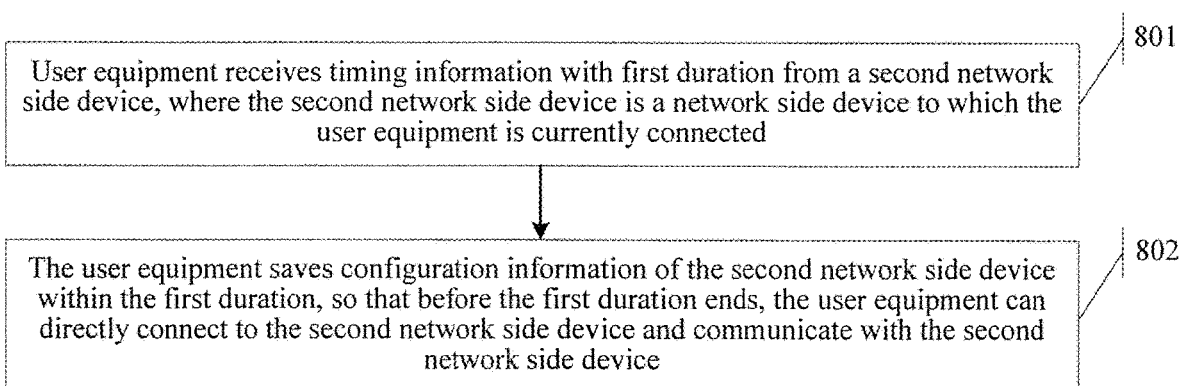
FIG. 8 is a method for saving configuration information according to an embodiment of this application.

As shown in FIG. 8, the method includes:

Step 801: User equipment receives timing information with first duration from a second network side device, where the second network side device is a network side device to which the user equipment is currently connected.

In actual application, the timing information is delivered to the user equipment by the second network side device when delivering measurement configuration or delivering configuration information of at least one first network side device.

Step 802: The user equipment saves configuration information of the second network side device within first duration, so that before the first duration ends, the user equipment can directly connect to the second network side device and communicate with the second network side device.

For example, after receiving the timing information, the user equipment triggers a preset timer T1, and saves the configuration information of the second network side device, so that before the first duration ends, the user equipment can directly connect to the second network side device and communicate with the second network side device, and does not need the first network side device, which avoids a problem that because the user equipment cannot communicate with the first network side device, the handover fails. Certainly, the first duration may also be pre-determined through negotiation between the user equipment and the second network side device, which is not limited in this application.

Embodiment 7

Based on the same invention concept, this application further provides a method for saving configuration information.

Figure 9:
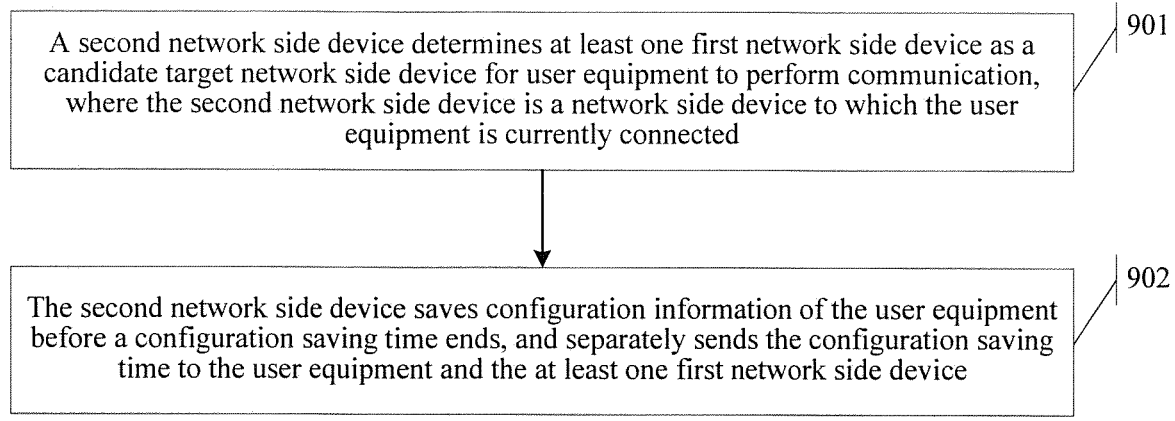
FIG. 9 is a method for saving configuration information according to another embodiment of this application.

Referring to FIG. 9, the method includes:

Step 901: A second network side device determines at least one first network side device as a candidate target network side device to communication with user equipment, where the second network side device is a network side device to which the user equipment is currently connected.

Step 902: The second network side device saves configuration information of the user equipment before a configuration saving time ends, and separately sends the configuration saving time to the user equipment and the at least one first network side device.

Specifically, the configuration saving time is carried in a handover command message sent by the second network side device and is sent to the at least one first network side device. The configuration saving time sent to the user equipment is carried in the configuration information of the at least one first network side device; in this way, when the second network side device needs to provide a service for the user equipment again, the user equipment may directly connect to the second network side device, or the first network side device may directly hand over the user equipment back to the second network side device, to implement rapid handover of the user equipment.

Certainly, to farther ensure that the user equipment can be rapidly handed over between the first network side device and the second network side device, the second network side device may further send timing information with first duration to the user equipment, so that the user equipment saves configuration information of the second network side device within the first duration after receiving the timing information; in this way, the user equipment can directly connect to the second network side device, and does not need the first network side device, which avoids a problem that because the user equipment cannot communicate with the first network side device, the handover fails. Certainly, the first duration may also be determined by the user equipment itself, or may be set through negotiation between the user equipment and the second network side device, which is not limited in this application.

It should be noted that, the second network side device may be specifically a serving base station, or may be a serving base station and an anchor. When the second network side device is a second network side device and an anchor, in the foregoing process, a method step on a control plane is executed by the anchor, and the serving base station is only configured to execute a method step on a data plane, that is, receive, from a service gateway, a data packet for the user equipment, and forward the data packet to the anchor, so that the anchor sends the data packet to the user equipment.

Embodiment 8

Based on the same invention concept, this application further provides an apparatus for selecting a target network side device.

Figure 10:
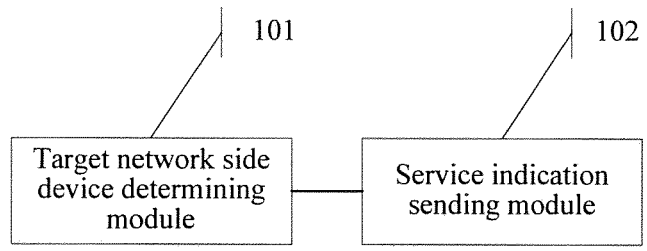
FIG. 10 is a functional block diagram of an apparatus for selecting a target network side device according to an embodiment of this application.

Referring to FIG. 10, the apparatus includes:

a target network side device determining module 101, configured to: after at least one first network side device completes admission control and receives a data packet for user equipment, select, from the at least one first network side device according to configuration information of the at least one first network side device, a first network side device that meets a first preset condition as a target network side device to communication with the user equipment, where the at least one first network side device is a candidate target network side device that is determined by a second network side device and that is for communication with the user equipment that meets a second preset condition; and a service indication sending module 102, configured to send, to the first network side device, a message instructing the first network side device to provide a service for the user equipment, so that the first network side device sends the data packet to the user equipment.

Specifically, the data packet for the user equipment is sent by a service gateway to both the at least one first network side device and the second network side device.

Further, the apparatus may further include: a user side protocol sequence number sending module, configured to: after the user equipment selects, from the at least one first network side device according to the configuration information of the at least one first network side device, the first network side device that meets the first preset condition as the target network side device to communication with the user equipment, send, to the first network side device, a user side protocol sequence number of the last data packet that is received by the user equipment before the user equipment communicates with the first network side device or a user side protocol sequence number of a data packet that the user equipment expects to receive next time, so that the first network side device can determine, according to the user side protocol sequence number, protocol sequence number mapping information of the data packet that is from the second network side device and that is for the user equipment, and a network side protocol sequence number of the data packet received by the first network side device, a user side protocol sequence number of a data packet that needs to be sent to the user equipment, where the protocol sequence number mapping information is specifically a mapping relationship between a network side protocol sequence number and a user side protocol sequence number that are of the data packet sent by the second network side device to the user equipment, or a network side protocol sequence number and a user side protocol sequence number that are of the data packet sent by the second network side device to the user equipment.

Preferably, the network side protocol sequence number is a General Packet Radio Service Tunnelling Protocol for the user plane GTP-U sequence number; and the user side protocol sequence number is a Packet Data Convergence Protocol PDCP sequence number.

Further, the target network side device determining module specifically includes: a measurement module, configured to measure the at least one first network side device according to the configuration information of the at least one first network side device, to obtain at least one measurement result; and a determining module, configured to determine, according to the at least one measurement result and the first preset condition, the first network side device as the target network side device to communication with the user equipment.

Optionally, the first preset condition is delivered to the measurement module by the second network side device while the second network side device delivers the second preset condition.

Optionally, the first preset condition is determined by the measurement module according to a cell reselection criterion after the measurement module reads a network side system broadcast message.

Further, the service indication sending module 102 is further configured to: after the user equipment sends, to the first network side device, a message instructing the first network side device to provide a service for the user equipment, send, to the second network side device, information instructing the second network side device to stop serving the user equipment, so that the second network side device stops sending the data packet to the user equipment.

Further, the apparatus further includes: a data packet receiving module, configured to: when the user equipment sends, to the first network side device, the message instructing the first network side device to provide a service for the user equipment, and does not send, to the second network side device, the message instructing the second network side device to stop serving the second network side device, receive a data packet from the second network side device.

Further, the apparatus further includes: a timing information receiving module, configured to: before the user equipment selects, from the at least one first network side device, the first network side device that meets the first preset condition as the target network side device to communication with the user equipment, receive timing information with first duration from the second network side device, and before the first duration ends, save configuration information of the second network side device, so that the user equipment can directly communicate with the second network side device before the first duration ends.

Specifically, the timing information is sent by the second network side device while the second network side device sends the configuration information of the at least one first network side device.

Embodiment 9

Based on the same invention concept, this application further provides an apparatus for transmitting a data packet.

Figure 11:
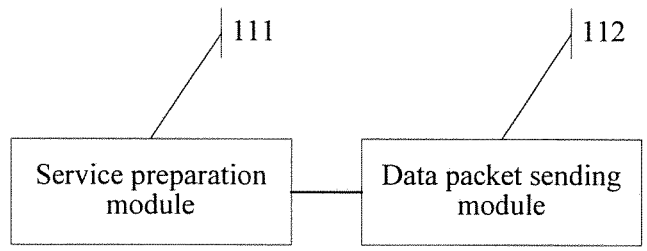
FIG. 11 is a functional block diagram of an apparatus for transmitting a data packet according to an embodiment of this application.

As shown in FIG. 11, the apparatus includes:

a service preparation module 111, configured to: after a handover command message that is of a second network side device and that is for user equipment is received, complete admission control, and receive a data packet for the user equipment, where the data packet for the user equipment is sent by a service gateway to both the service preparation module and the second network side device; and a data packet sending module 112, configured to send the data packet to the user equipment after a first network side device receives, from the user equipment, a message instructing the first network side device to provide a service for the user equipment, where the message instructing the first network side device to provide a service for the user equipment is sent by the user equipment after the user equipment determine s that the first network side device meets a first preset condition.

Specifically, the data packet sending module 112 may include: a user side protocol sequence number determining module, configured to determine, according to protocol sequence number mapping information of the data packet that is for the user equipment and that is sent by the second network side device, a user side protocol sequence number sent by the user equipment and of the last data packet that is received by the user equipment before the user equipment communicates with the first network side device or a user side protocol sequence number sent by the user equipment and of a data packet that the user equipment expects to receive next time, and a network side protocol sequence number of the data packet received by the first network side device, a user side protocol sequence number of a data packet that needs to be sent to the user equipment, where the protocol sequence number mapping information is specifically a mapping relationship between a network side protocol sequence number and a user side protocol sequence number that are of the data packet sent by the second network side device to the user equipment, or a network side protocol sequence number and a user side protocol sequence number that are of the data packet sent by the second network side device to the user equipment; and a data packet sending submodule, configured to send the data packet to the user equipment according to the user side protocol sequence number.

Preferably, the network side protocol sequence number is a General Packet Radio Service Tunnelling Protocol for the user plane GTP-U sequence number; and the user side protocol sequence number is a Packet Data Convergence Protocol PDCP sequence number.

Embodiment 10

Based on the same invention concept, this application further provides an apparatus for selecting a target network side device.

Figure 12:
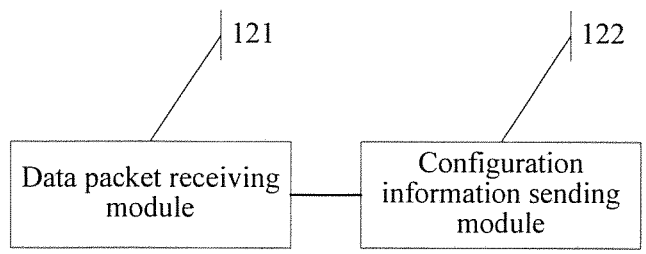
FIG. 12 is a functional block diagram of an apparatus for selecting a target network side device according to another embodiment of this application.

Referring to FIG. 12, the apparatus includes:

a data packet receiving module 121, configured to receive, from a service gateway, a data packet for user equipment, where the data packet is sent by the service gateway to both a second network side device and at least one first network side device; and a configuration information sending module 122, configured to send configuration information of the at least one first network side device to the user equipment after the second network side device receives, from the service gateway, an indication indicating that the data packet is concurrently sent successfully, so that the user equipment can directly communicate with the first network side device.

Further, the apparatus further includes: a protocol sequence number mapping information sending module, configured to: before the configuration information sending module sends the configuration information of the at least one first network side device to the user equipment, send protocol sequence number mapping information of the data packet for the user equipment to the first network side device, so that the first network side device determines, according to the protocol sequence number mapping information, a user side protocol sequence number sent by the user equipment and of the last data packet that is received by the user equipment before the user equipment communicates with the first network side device or a user side protocol sequence number sent by the user equipment and of a data packet that the user equipment expects to receive next time, and a network side protocol sequence number of the data packet received by the first network side device, a user side protocol sequence number of a data packet that needs to be sent to the user equipment, where the protocol sequence number mapping information is specifically a mapping relationship between a network side protocol sequence number and a user side protocol sequence number that are of the data packet sent by the second network side device to the user equipment, or a network side protocol sequence number and a user side protocol sequence number that are of the data packet sent by the second network side device to the user equipment.

Preferably, the network side protocol sequence number is a General Packet Radio Service Tunnelling Protocol for the user plane GTP-U sequence number; and the user side protocol sequence number is a Packet Data Convergence Protocol PDCP sequence number.

Further, the apparatus further includes: a service indication receiving module, configured to: after the configuration information sending module sends the configuration information of the at least one first network side device to the user equipment, receive, from the user equipment, information instructing the apparatus to stop serving the user equipment, and stop sending the data packet to the user equipment.

Further, the apparatus further includes: a data bearer teardown indication sending module, configured to: after the service indication receiving module receives, from the user equipment, the information instructing the user equipment to stop serving the user equipment, send a data bearer teardown indication to a mobility control node, so that the mobility control node instructs the service gateway to stop sending the data packet for the user equipment to the data packet receiving module.

Further, the data bearer teardown indication sending module is specifically configured to: after second duration ends, send a data bearer teardown indication to the mobility control node, so that the mobility control node instructs the service gateway to stop sending the data packet for the user equipment to the second network side device.

Further, the apparatus further includes: a configuration information saving module, configured to: after the second network side device determines the at least one first network side device as the candidate target network side device to communication with the user equipment, save configuration information of the user equipment before a configuration saving time ends; and a configuration saving time sending module, configured to separately send the configuration saving time to the user equipment and the at least one first network side device.

Specifically, the configuration saving time is carried in a handover command message and is sent to the at least one first network side device, or the configuration saving time is carried in the configuration information of the at least one first network side device and is sent to the user equipment.

Further, the apparatus further includes: a timing information sending module, configured to send timing information with first duration to the user equipment, so that the user equipment saves configuration information of the second network side device within the first duration after receiving the timing information.

Embodiment 11

Based on the same invention concept, this application further provides an apparatus for transmitting a data packet.

Figure 13:
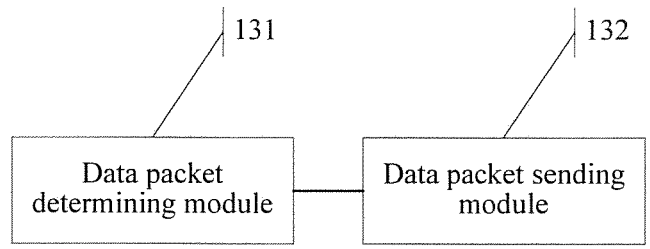
FIG. 13 is a functional block diagram of an apparatus for transmitting a data packet according to another embodiment of this application.

Referring to FIG. 13, the apparatus includes:
a data packet determining module 131, configured to determine a data packet that needs to be sent to user equipment; and
a data packet sending module 132, configured to send, to both at least one first network side device and a second network side device, the data packet that needs to be sent to the user equipment, where the at least one first network side device is a candidate target network side device that is determined by the second network side device for the user equipment that meets a second preset condition and that is for communication with the user equipment that meets a second preset condition, and the second network side device is a network side device to which the user equipment is currently connected.

Specifically, the data packet sending module 132 is specifically configured to concurrently send, to the at least one first network side device according to transmission layer address information that is of the at least one first network side device and that is obtained by using a mobility control node, the data packet that needs to be sent to the user equipment.

Embodiment 12

Based on the same invention concept, this application further provides an apparatus for saving configuration information.

Figure 14:
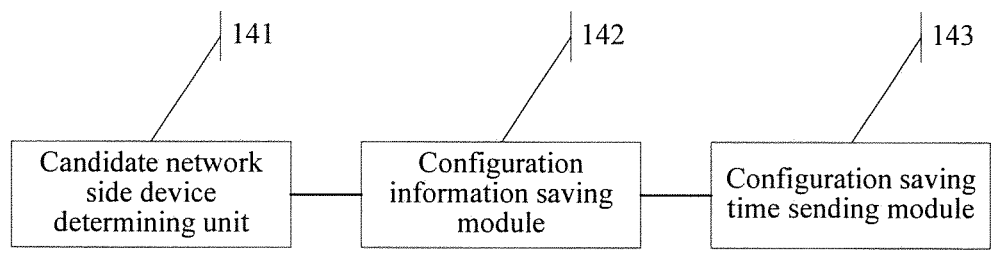
FIG. 14 is a functional block diagram of an apparatus for saving configuration information according to an embodiment of this application.

Referring to FIG. 14, the apparatus includes:
a candidate network side device determining unit 141, determining at least one first network side device as a candidate target network side device to communication with user equipment, where the second network side device is a network side device to which the user equipment is currently connected;
a configuration information saving module 142, configured to save configuration information of the user equipment before a configuration saving time ends; and
a configuration saving time sending module 143, configured to separately send the configuration saving time to the user equipment and the at least one first network side device.

Specifically, the configuration saving time is carried in a handover command message sent by the second network side device and is sent to the at least one first network side device.

Embodiment 13

Based on the same invention concept, this application further provides an apparatus for saving configuration information.

Figure 15:
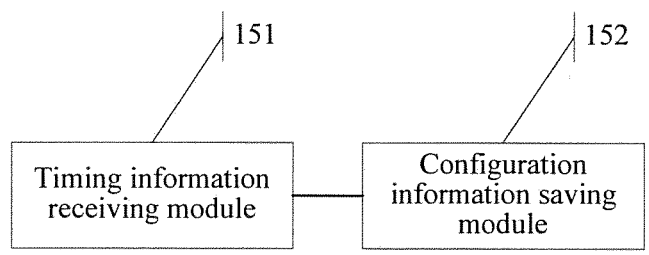
FIG. 15 is a functional block diagram of an apparatus for saving configuration information according to another embodiment of this application.

Referring to FIG. 15, the apparatus includes:
a timing information receiving module 151, configured to receive timing information with first duration from a second network side device, where the second network side device is a network side device to which user equipment is currently connected; and
a configuration information saving module 152, configured to save configuration information of the second network side device within the first duration, so that before the first duration ends, the user equipment can directly connect to the second network side device and communicate with the second network side device.

Embodiment 14

Based on the same invention concept, this application further provides user equipment. The user equipment may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks by using a radio access network (such as RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges language and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile terminal, a remote station, an access point, a remote terminal, an access terminal, a user terminal, a user agent, a user device, or user equipment.

Figure 16:
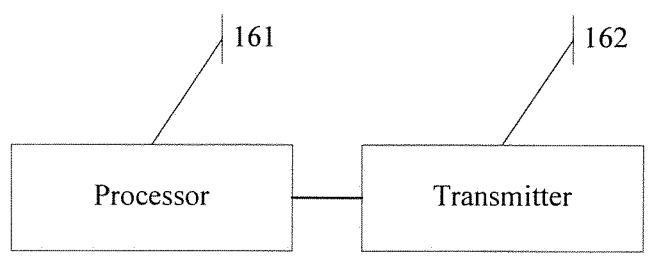
FIG. 16 is a functional block diagram of user equipment according to an embodiment of this application.

Referring to FIG. 16, the user equipment includes: a processor 161, configured to: after at least one first network side device completes admission control and receives a data packet for user equipment, select, from the at least one first network side device according to configuration information of the at least one first network side device, a first network side device that meets a first preset condition as a target network side device to communication with the user equipment, where the at least one first network side device is a candidate target network side device that is determined by a second network side device and that is for communication with the user equipment that meets a second preset condition; and a transmitter 162, configured to send, to the first network side device, a message instructing the first network side device to provide a service for the user equipment, so that the first network side device sends the data packet to the user equipment.

Further, the data packet for the user equipment is sent by a service gateway to both the at least one first network side device and the second network side device.

Further, the transmitter 162 is further configured to: after the user equipment selects, from the at least one first network side device according to the configuration information of the at least one first network side device, the first network side device that meets the first preset condition as the target network side device to communication with the user equipment, send, to the first network side device, a user side protocol sequence number of the last data packet that is received by the user equipment before the user equipment communicates with the first network side device or a user side protocol sequence number of a data packet that the user equipment expects to receive next time, so that the first network side device can determine, according to the user side protocol sequence number, protocol sequence number mapping information of the data packet that is from the second network side device and that is for the user equipment, and a network side protocol sequence number of the data packet received by the first network side device, a user side protocol sequence number of a data packet that needs to be sent to the user equipment, where the protocol sequence number mapping information is specifically a mapping relationship between a network side protocol sequence number and a user side protocol sequence number that are of the data packet sent by the second network side device to the user equipment, or a network side protocol sequence number and a user side protocol sequence number that are of the data packet sent by the second network side device to the user equipment.

Preferably, the network side protocol sequence number is a General Packet Radio Service Tunnelling Protocol for the user plane GTP-U sequence number; and the user side protocol sequence number is a Packet Data Convergence Protocol PDCP sequence number.

Further, the processor 161 is specifically configured to: measure, by the user equipment, the at least one first network side device according to the configuration information of the at least one first network side device, to obtain at least one measurement result; and determine, by the user equipment according to the at least one measurement result and the first preset condition, the first network side device as the target network side device to communication with the user equipment.

Optionally, the first preset condition is delivered to the user equipment by the second network side device while the second network side device delivers the second preset condition.

Optionally, the first preset condition is determined by the user equipment according to a cell reselection criterion after the user equipment reads a network side system broadcast message.

Further, the transmitter 162 is further configured to: after the user equipment sends, to the first network side device, a message instructing the first network side device to provide a service for the user equipment, send, to the second network side device, information instructing the second network side device to stop serving the user equipment, so that the second network side device stops sending the data packet to the user equipment.

Further, the user equipment further includes: a first receiver, configured to: when the user equipment sends, to the first network side device, the message instructing the first network side device to provide a service for the user equipment, and does not send, to the second network side device, the message instructing the second network side device to stop serving the user equipment, receive a data packet from the second network side device.

Further, the user equipment further includes: a second receiver, configured to: before the user equipment selects, from the at least one first network side device, the first network side device that meets the first preset condition as the target network side device to communication with the user equipment, receive timing information with first duration from the second network side device, and before the first duration ends, save configuration information of the second network side device, so that the user equipment can directly communicate with the second network side device before the first duration ends.

The first receiver and the second receiver may be the same receiver, or may be different receivers, which is not specifically limited in this application.

Preferably, the timing information is sent by the second network side device while the second network side device sends the configuration information of the at least one first network side device.

Embodiment 15

Based on the same invention concept, this application further provides a network side device, where the network side device may refer to a device that is in an access network and that communicates with a radio terminal on an air interface by using one or more sectors. The network side device may be configured to perform interconversion on a received air frame and an IP packet, and is used as a router between the radio terminal and the rest part of the access network, where the rest part of the access network may include an Internet protocol (IP) network. The network side device may further coordinate attribute management on the air interface. For example, the network side device may be a base station (BTS, Base Transceiver Station) in CDMA, may be a base station (NodeB) in WCDMA, or may be an evolved Node B (NodeB or eNB or e-NodeB, evolved Node B) in LTE, which is not limited in this application.

Figure 17:
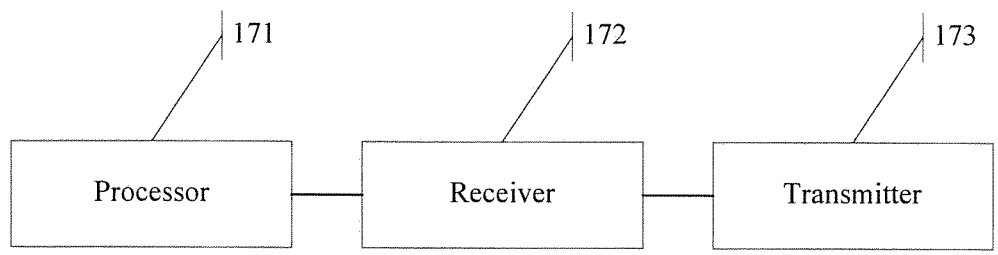
FIG. 17 is a functional block diagram of a network side device according to an embodiment of this application.

As shown in FIG. 17, the network side device includes: a processor 171, configured to complete admission control after the network side device receives a handover command message that is of a second network side device and that is for user equipment; a receiver 172, configured to receive a data packet for the user equipment, where the at least one network side device is a candidate target network side device that is determined by the second network side device and that is for communication with the user equipment that meets a second preset condition, and the data packet for the user equipment is sent by a service gateway to both the network side device and the second network side device; and a transmitter 173, configured to send the data packet to the user equipment after the receiver 172 receives, from the user equipment, a message instructing the network side device to provide a service for the user equipment, where the message instructing the network side device to provide a service for the user equipment is sent by the user equipment after the user equipment determines that the network side device meets a first preset condition.

The receiver 172 and the transmitter 173 may be integrated into a transceiver, or may be two independent apparatuses, which is not limited in this application.

Further, the transmitter 173 is specifically configured to determine, according to protocol sequence number mapping information of the data packet that is for the user equipment and that is sent by the second network side device, a user side protocol sequence number sent by the user equipment and of the last data packet that is received by the user equipment before the user equipment communicates with the network side device or a user side protocol sequence number sent by the user equipment and of a data packet that the user equipment expects to receive next time, and a network side protocol sequence number of the data packet received by the network side device, a user side protocol sequence number of a data packet that needs to be sent to the user equipment, and send the data packet to the user equipment according to the user side protocol sequence number, where the protocol sequence number mapping information is specifically a mapping relationship between a network side protocol sequence number and a user side protocol sequence number that are of the data packet sent by the second network side device to the user equipment, or a network side protocol sequence number and a user side protocol sequence number that are of the data packet sent by the second network side device to the user equipment.

Preferably, the network side protocol sequence number is a General Packet Radio Service Tunnelling Protocol for the user plane GTP-U sequence number; and the user side protocol sequence number is a Packet Data Convergence Protocol PDCP sequence number.

Further, the receiver 172 is further configured to receive, from a service gateway, a data packet for user equipment, where the data packet is sent by the service gateway to both the network side device and at least one first network side device, and the at least one first network side device is a candidate target network side device that is determined by the network side device and that is for communication with the user equipment that meets a second preset condition; and the transmitter 173 is further configured to send configuration information of the at least one first network side device to the user equipment after the receiver 172 receives, from the service gateway, an indication indicating that the data packet is concurrently sent successfully, so that the user equipment can directly communicate with the first network side device.

Further, the transmitter 173 is further configured to: before the transmitter 173 sends the configuration information of the at least one first network side device to the user equipment, send protocol sequence number mapping information of the data packet for the user equipment to the first network side device, so that the first network side device determines, according to the protocol sequence number mapping information, a user side protocol sequence number sent by the user equipment and of the last data packet that is received by the user equipment before the user equipment communicates with the first network side device or a user side protocol sequence number sent by the user equipment and of a data packet that the user equipment expects to receive next time, and a network side protocol sequence number of the data packet received by the first network side device, a user side protocol sequence number of a data packet that needs to be sent to the user equipment, where the protocol sequence number mapping information is specifically a mapping relationship between a network side protocol sequence number and a user side protocol sequence number that are of the data packet sent by the network side device to the user equipment, or a network side protocol sequence number and a user side protocol sequence number that are of the data packet sent by the network side device to the user equipment.

Specifically, the network side protocol sequence number is a General Packet Radio Service Tunnelling Protocol for the user plane GTP-U sequence number; and the user side protocol sequence number is a Packet Data Convergence Protocol PDCP sequence number.

Further, the receiver 172 is further configured to: after the transmitter 173 sends the configuration information of the at least one first network side device to the user equipment, receive, from the user equipment, information instructing the network side device to stop serving the user equipment, and stop sending the data packet to the user equipment.

Further, the transmitter 173 is further configured to: after the receiver receives, from the user equipment, the information instructing the network side device to stop serving the user equipment, send a data bearer teardown indication to a mobility control node, so that the mobility control node instructs the service gateway to stop sending the data packet for the user equipment to the network side device.

Further, the transmitter 173 is specifically configured to: after second duration ends, send the data bearer teardown indication to the mobility control node, so that the mobility control node instructs the service gateway to stop sending the data packet for the user equipment to the network side device.

Further, the network side device further includes: a memory, configured to: after the network side device determines the at least one first network side device as the candidate target network side device to communication with the user equipment, save configuration information of the user equipment before a configuration saving time ends, where the transmitter 173 is configured to separately send the configuration saving time to the user equipment and the at least one first network side device.

Optionally, the configuration saving time is carried in a handover command message and is sent to the at least one first network side device.

Optionally, the configuration saving time is carried in the configuration information of the at least one first network side device and is sent to the user equipment.

Further, the transmitter 173 is further configured to send timing information with first duration to the user equipment, so that the user equipment saves configuration information of the network side device within the first duration after receiving the timing information.

Embodiment 16

Based on the same invention concept, this application further provides a service gateway, where the service gateway may be an SGW in LTE, or may be an SGSN (Serving General Packet Radio Service Support Node, serving general packet radio service support node) in GSM or UMTS, which is not limited in this application.

The service gateway includes:

a transmitter, configured to determine a data packet that needs to be sent to user equipment; and further configured to send, by the service gateway to both at least one first network side device and a second network side device, the data packet that needs to be sent to the user equipment, where the at least one first network side device is a candidate target network side device that is determined by the second network side device for the user equipment that meets a second preset condition and that is for communication with the user equipment that meets a second preset condition, and the second network side device is a network side device to which the user equipment is currently connected.

Further, the transmitter is specifically configured to concurrently send, to the at least one first network side device according to transmission layer address information that is of the at least one first network side device and that is obtained by using a mobility control node, the data packet that needs to be sent to the user equipment.

Embodiment 17

Based on the same invention concept, this application further provides a network side device.

Figure 18:
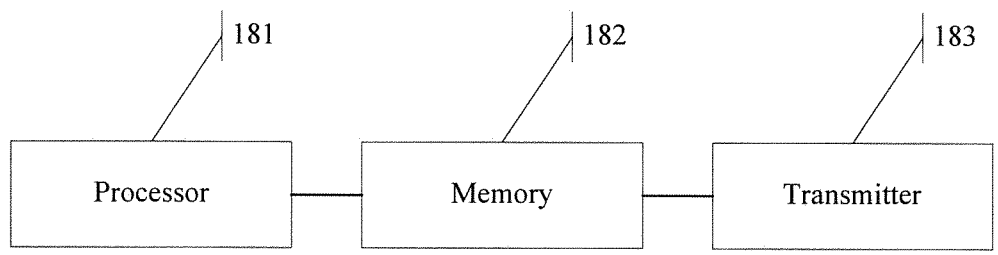
FIG. 18 is a functional block diagram of a network side device according to another embodiment of this application.

Referring to FIG. 18, the network side device includes:

a processor 181, configured to determine at least one first network side device as a candidate target network side device to communication with user equipment, where the network side device is a network side device to which the user equipment is currently connected;

a memory 182, configured to save configuration information of the user equipment before a configuration saving time ends; and a transmitter 183, configured to separately send the configuration saving time to the user equipment and the at least one first network side device.

Further, the configuration saving time is carried in a handover command message sent by the network side device and is sent to the at least one first network side device. The configuration saving time sent to the user equipment may be carried in measurement configuration delivered by a second network side device to the user equipment, or configuration information delivered to the at least one first network side device, and is delivered.

Embodiment 18

Based on the same invention concept, this application further provides user equipment.

Figure 19:
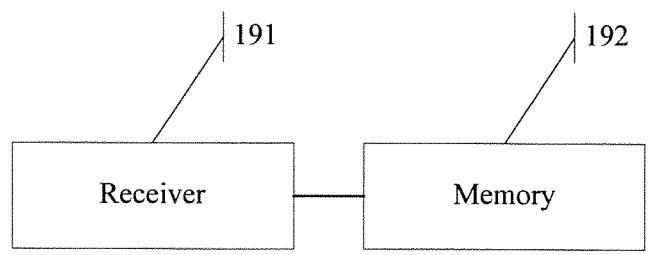
FIG. 19 is a functional block diagram of user equipment according to another embodiment of this application.

As shown in FIG. 19, the user equipment includes:

a receiver 191, configured to receive timing information with first duration from a second network side device, where the second network side device is a network side device to which the user equipment is currently connected; and a memory 192, configured to save configuration information of the second network side device within the first duration, so that before the first duration ends, the user equipment can directly access the second network side device and communicate with the second network side device.

It should be noted that, the first network side device and the second network side device in the foregoing one or more embodiments may be two independent network side devices, or may be a same network side device, which is not specifically limited in this application.

Further, the second network side device may be specifically a serving base station, or may be a serving base station and an anchor. When the second network side device is a second network side device and an anchor, in the foregoing process, a method step on a control plane is executed by the anchor, and the serving base station is configured to execute a method step on a data plane.

The one or more embodiments of the present invention can achieve the following technical effects:

In the embodiments of the present invention, during downlink data transmission, after at least one first network side device used as a candidate target network side device completes admission control and receives a data packet for user equipment, the user equipment selects, from the at least one first network side device according to configuration information of the first network side device, a first network side device that meets a first preset condition as a target network side device, and sends, to the selected first network side device, a message instructing the first network side device to provide a service for the user equipment, so that the first network side device can send the data packet to the user equipment, and provide a service for the user equipment. In this way, during handover between cells, the user equipment can directly instruct the target network side device to provide a service for the user equipment, and a long handover preparation process is not needed, thereby implementing rapid handover, improving handover efficiency, and reducing call drops.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the exemplary embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A user equipment comprising:
    a processor configured to: select, after at least one network side device completes admission control and receives a data packet for the user equipment, a first network side device of the at least one network side device according to configuration information of the at least one network side device to communicate with the user equipment, wherein the selected first network side device is a target network side device based on meeting a first preset condition and is a candidate target network side device that is determined by a second network side device based on meeting a second preset condition;
    a transmitter configured to send, to the selected first network side device, a message for instructing the selected first network side device to provide a service for the user equipment and send the data packet to the user equipment; and
    a receiver configured to: before the user equipment selects, from the at least one network side device, the first network side device, receive timing information with a first duration from the second network side device, and before the first duration ends, save configuration information of the second network side device to enable the user equipment to directly communicate with the second network side device before the first duration ends.

2. The user equipment according to claim 1, wherein the receiver is configured to receive the timing information from the second network side device while the second network side device sends the configuration information of the at least one network side device.

3. The user equipment according to claim 1, wherein the transmitter is further configured to:
    after the processor selects the first network side device, send, to the first network side device, a user side protocol sequence number of:
        (i) a last data packet that is received by the user equipment before the user equipment communicates with the selected first network side device, or
        (ii) a data packet that the user equipment expects to receive at a next time,
    wherein the user side protocol sequence number of the last data packet is sent to the selected first network side device to enable the selected first network side device to determine protocol sequence number mapping information of the data packet, a network side protocol sequence number of the data packet, and a user side protocol sequence number of a data packet, wherein the protocol sequence number mapping information comprises a mapping relationship between a network side protocol sequence number and a user side protocol sequence number.

4. The user equipment according to claim 3, wherein:
    the network side protocol sequence number is a General Packet Radio Service Tunnelling Protocol for a user plane (GTP-U) sequence number; and
    the user side protocol sequence number is a Packet Data Convergence Protocol (PDCP) sequence number.

5. The user equipment according to claim 1, wherein the processor is configured to:
    measure a signal strength of the at least one network side device according to the configuration information of the at least one network side device to obtain at least one measurement result; and
    select according to the at least one measurement result and the first preset condition, the first network side device as the target network side device to communicate with the user equipment.

6. The user equipment according to claim 5, wherein the first preset condition is received from the second network side device.

7. The user equipment according to claim 5, wherein the first preset condition is determined by the user equipment according to a cell reselection criterion after the user equipment receives a network side system broadcast message.

8. The user equipment according to claim 1, wherein the transmitter is further configured to:
    after the transmitter sends, to the selected first network side device, the message for instructing the selected first network side device to provide the service for the user equipment, send, to the second network side device, information for instructing the second network side device to stop serving the user equipment.

9. A network side device, comprising:
    a processor, configured to complete admission control after the network side device receives a handover command message from a second network side device, wherein the handover command message is configured for a user equipment;
    a receiver, configured to:

receive a data packet from a service gateway for the user equipment, wherein the network side device is a candidate target network side device that is determined by the second network side device based on meeting a second preset condition; and receive, from the user equipment, a message instructing the network side device to provide a service for the user equipment, wherein the message is received after the user equipment selects the network side device to be a target network side device based on meeting a first preset condition; and a transmitter, configured to send the data packet to the user equipment after the receiver receives the message, wherein the processor is further configured to determine that at least one first network side device is another candidate target network side device that is for communicating with the user equipment based on the at least one first network side device meeting the second preset condition;

wherein the receiver is further configured to receive, from the service gateway, the data packet configured for the user equipment and configured for reception by the receiver and the at least one first network side device; and the transmitter is further configured to send configuration information of the at least one first network side device to the user equipment after the receiver receives, from the service gateway, an indication indicating that the data packet is concurrently sent successfully;

wherein the processor is further configured to, after the network side device determines that the at least one first network side device is the candidate target network side device to communicate with the user equipment, save configuration information of the user equipment in a memory before a configuration saving time ends; and wherein the transmitter is configured to separately send the configuration saving time to the user equipment and the at least one first network side device.

10. The network side device according to claim 9, wherein:

the processor is configured to determine, according to protocol sequence number mapping information of the data packet that is configured for the user equipment and that is received from the second network side device:

a user side protocol sequence number of:
(i) a last data packet that is received by the user equipment before the user equipment communicates with the network side device, or
(ii) a data packet that the user equipment expects to receive at a next time, a network side protocol sequence number of the data packet, and a user side protocol sequence number of a data packet that needs to be sent to the user equipment; and the transmitter is configured to send the data packet to the user equipment according to the user side protocol sequence number, wherein the protocol sequence number mapping information comprises a mapping relationship between a network side protocol sequence number and a user side protocol sequence number.

11. The network side device according to claim 10, wherein:

the network side protocol sequence number is a General Packet Radio Service Tunnelling Protocol for a user plane (GTP-U) sequence number; and the user side protocol sequence number is a Packet Data Convergence Protocol (PDCP) sequence number.

12. The network side device according to claim 9, wherein:

the transmitter is further configured to, before the transmitter sends the configuration information of the at least one first network side device to the user equipment, send protocol sequence number mapping information of the data packet configured for the user equipment to the at least one first network side device to enable the at least one first network side device to determine, according to the protocol sequence number mapping information:

a user side protocol sequence number of:
(i) a last data packet that is received by the user equipment before the user equipment communicates with the first network side device, or
(ii) a data packet that the user equipment expects to receive at a next time, a network side protocol sequence number of the data packet received by the at least one first network side device, and a user side protocol sequence number of a data packet that needs to be sent to the user equipment, wherein the protocol sequence number mapping information comprises a mapping relationship between a network side protocol sequence number and a user side protocol sequence number.

13. The network side device according to claim 12, wherein:

the network side protocol sequence number is a General Packet Radio Service Tunnelling Protocol for a user plane (GTP-U) sequence number; and the user side protocol sequence number is a Packet Data Convergence Protocol (PDCP) sequence number.

14. The network side device according to claim 9, wherein the receiver is further configured to, after the transmitter sends the configuration information of the at least one first network side device to the user equipment, receive, from the user equipment, information for instructing the network side device to stop serving the user equipment, and stop sending the data packet to the user equipment.

15. The network side device according to claim 9, wherein the transmitter is further configured to, after the receiver receives, from the user equipment, the configuration information for instructing the network side device to stop serving the user equipment, send a data bearer teardown indication to a mobility control node to enable the mobility control node to instruct the service gateway to stop sending the data packet configured for the user equipment to the network side device.

16. The network side device according to claim 9, wherein the transmitter is configured to send a data bearer teardown indication to a mobility control node to enable the mobility control node to instruct the service gateway to stop sending the data packet configured for the user equipment to the network side device.

17. The network side device according to claim 9, wherein the configuration saving time is sent in a handover command message to the at least one first network side device.

18. The network side device according to claim 9, wherein the configuration saving time is sent in the configuration information of the at least one first network side device to the user equipment.

19. The network side device according to claim 9, wherein the transmitter is further configured to send timing information with a first duration to the user equipment to enable the user equipment to save configuration information of the network side device within the first duration after receiving the timing information.

* * * * *